(12) United States Patent
Onoyama et al.

(10) Patent No.: US 12,346,101 B2
(45) Date of Patent: Jul. 1, 2025

(54) CONTROL OF REAL MACHINE AND VIRTUAL MACHINE

(71) Applicant: KABUSHIKI KAISHA YASKAWA DENKI, Kitakyushu (JP)

(72) Inventors: Yoshifumi Onoyama, Fukuoka (JP); Yukio Hashiguchi, Fukuoka (JP); Yosuke Kamiya, Fukuoka (JP); Yuki Oe, Fukuoka (JP); Yu Katono, Fukuoka (JP); Tomoyuki Nakamura, Fukuoka (JP); Takahiro Hora, Fukuoka (JP)

(*) Notice: Subject to any disclaimer, the term of this patent is extended or adjusted under 35 U.S.C. 154(b) by 266 days.

(21) Appl. No.: 17/816,429

(22) Filed: Aug. 1, 2022

(65) Prior Publication Data

US 2023/0037774 A1 Feb. 9, 2023

(30) Foreign Application Priority Data

Aug. 3, 2021 (JP) .................. 2021-127307

(51) Int. Cl.
*G05B 19/418* (2006.01)
(52) U.S. Cl.
CPC . *G05B 19/41885* (2013.01); *G05B 19/41835* (2013.01)
(58) Field of Classification Search
None
See application file for complete search history.

(56) References Cited

U.S. PATENT DOCUMENTS

| 6,212,269 B1 | 4/2001 | Yamanaka et al. |
| 2010/0153073 A1 | 6/2010 | Nagatsuka et al. |
| 2013/0060378 A1 | 3/2013 | Schmitz et al. |
| 2014/0088949 A1 | 3/2014 | Moriya et al. |
| 2015/0161808 A1 | 6/2015 | Oya et al. |
| 2017/0068235 A1 | 3/2017 | Manabe et al. |

(Continued)

FOREIGN PATENT DOCUMENTS

| CN | 106597863 | 4/2017 |
| CN | 112847328 | 5/2021 |

(Continued)

OTHER PUBLICATIONS

Li, Lan, et al. "Digital twin-based control approach for industrial cloud robotics." International Manufacturing Science and Engineering Conference. vol. 58745. American Society of Mechanical Engineers, 2019. (Year: 2019).*

(Continued)

*Primary Examiner* — Carlos R Ortiz Rodriguez
(74) *Attorney, Agent, or Firm* — SOEI PATENT & LAW FIRM

(57) ABSTRACT

The controller communicable with a second controller include circuitry configured to: execute a processing to operate a first machine in collaboration with a second machine controlled by the second controller in a real space; modify the processing in response to determining that, instead of controlling the second machine, the second controller controls a virtual second machine that simulates operations of the second machine in a virtual space; and execute the modified processing to operate the first machine in the real space in collaboration with the virtual second machine that operates in the virtual space.

20 Claims, 20 Drawing Sheets

(56) References Cited

U.S. PATENT DOCUMENTS

| | | |
|---|---|---|
| 2017/0108885 A1 | 4/2017 | Meganathan et al. |
| 2019/0051049 A1 | 2/2019 | Shimakawa et al. |
| 2019/0265668 A1 | 8/2019 | Kuya |
| 2021/0154849 A1 | 5/2021 | Ichimaru et al. |
| 2022/0001537 A1 | 1/2022 | Hashiguchi et al. |

FOREIGN PATENT DOCUMENTS

| | | |
|---|---|---|
| DE | 112018007477 | 1/2021 |
| JP | H9-018906 | 1/1997 |
| JP | 2002-318607 | 10/2002 |
| JP | 2014-063327 | 4/2014 |
| JP | 2015-176340 | 10/2015 |
| JP | 6898506 | 7/2021 |
| WO | 2011/088979 | 7/2011 |

OTHER PUBLICATIONS

Office Action issued in European Patent Application No. 22188070.1, dated Jun. 25, 2024.
Office Action issued in Japanese Patent Application No. P2021-127307, dated Dec. 7, 2021 (with English partial translation).
Extended Search Report in corresponding European Application No. 22188070.1, dated Jan. 9, 2023.

* cited by examiner

CONTROL OF REAL MACHINE AND VIRTUAL MACHINE

CROSS-REFERENCE TO RELATED APPLICATIONS

This application is based upon and claims the benefit of priority from Japanese Patent Application No. 2021-127307, filed on Aug. 3, 2021, the entire contents of which are incorporated herein by reference.

BACKGROUND

Field

The present disclosure relates to a controller.

Description of the Related Art

Japanese Unexamined Patent Publication No. 2015-176340 discloses a controller including a storage unit that stores setting information specifying whether to use a real device or to use a virtual device program simulating the real device instead of the real device, and a program execution unit that executes the virtual device program when it is specified to use the virtual device with reference to the setting information.

SUMMARY

Disclosed herein is a controller. The controller may be communicable with a second controller. The controller may include circuitry configured to: execute a processing to operate a first machine in collaboration with a second machine controlled by the second controller in a real space; modify the processing in response to determining that, instead of controlling the second machine, the second controller controls a virtual second machine that simulates operations of the second machine in a virtual space; and execute the modified processing to operate the first machine in the real space in collaboration with the virtual second machine that operates in the virtual space.

Additionally, another controller is disclosed herein. The other controller may be communicable with a second controller. The other controller may include circuitry configured to: determine whether a control target is a machine that operates in a real space or a virtual machine that simulates operations of the machine in a virtual space; transmit, to a second controller, a notification information to notify the second controller whether the control target is the machine or the virtual machine; control the control target to operate in the real space in response to determining that the control target is the machine; and control the control target to operate in the virtual space in response to determining that the control target is the virtual machine.

Additionally, a method is disclosed herein. The method may include: determining whether a second controller controls a machine to operate in a real space or a virtual machine to simulate operations of the machine in a virtual space; executing a real processing in response to determining that the second controller controls the machine; and executing a virtual processing at least partially different from the real processing in response to determining that the second controller controls the virtual machine.

DETAILED DESCRIPTION

In the following description, with reference to the drawings, the same reference numbers are assigned to the same components or to similar components having the same function, and overlapping description is omitted.

Machine System

Figure 1:
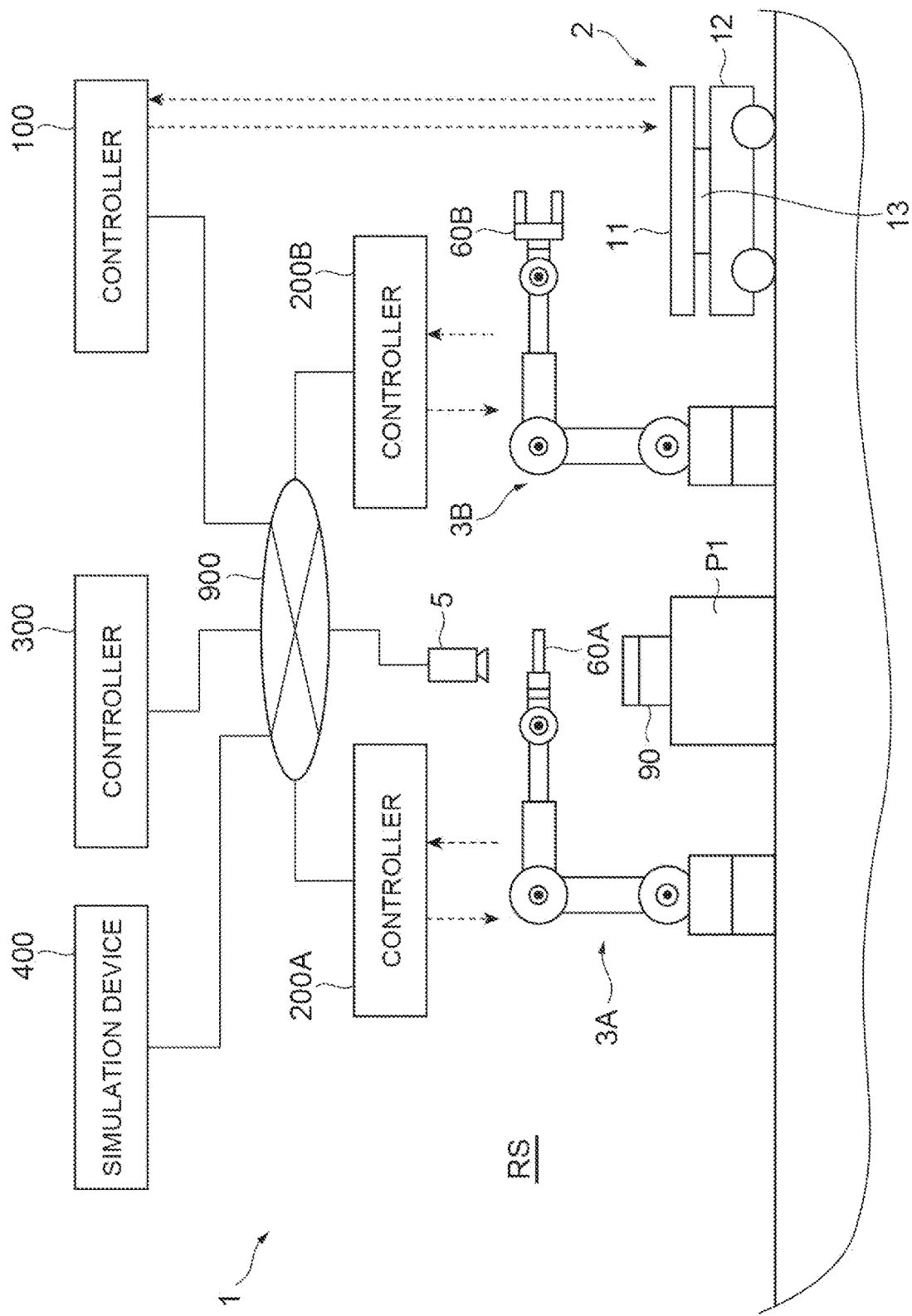
FIG. 1 is a schematic diagram illustrating an example configuration of a machine system.

A machine system 1 illustrated in FIG. 1 is a system that performs production or the like of a workpiece by cooperation of a plurality of machines. As an example, the machine system 1 includes a machine 2, machines 3A and 3B, a camera 5, controllers 100, 200A, and 200B for control, a controller 300 for setting, and a simulation device 400.

The machine 2 is a transport device that transports a workpiece 90, and includes a loading table 11, an automatic guided vehicle 12, and a load sensor 13. The loading table 11 supports the workpiece 90 to be transported. The automatic guided vehicle 12 supports the loading table 11 and travels a predetermined transport route. The load sensor 13 detects whether or not the workpiece 90 exists on the loading table 11 based on, for example, the weight of the loading table 11.

The machine 3A performs a screw fastening operation on the workpiece 90. For example, the machine 3A is a so-called vertically articulated robot, and the position and posture of a tool 60A for screw fastening are adjusted by an articulated arm, and the screw fastening operation is performed by the tool 60A. The machine 3B arranges the workpiece 90 onto a working position P1 for screw fastening by the machine 3A, and transports the workpiece 90 after screw fastening from the working position P1 to the loading table 11. For example, the machine 3B is a so-called vertically articulated robot, and transports the workpiece 90 by gripping the workpiece 90 with a tool 60B for gripping and changing the position and posture of the tool 60B with an articulated arm. The camera 5 detects an installation state of the workpiece 90 in the working position P1.

Figure 2:
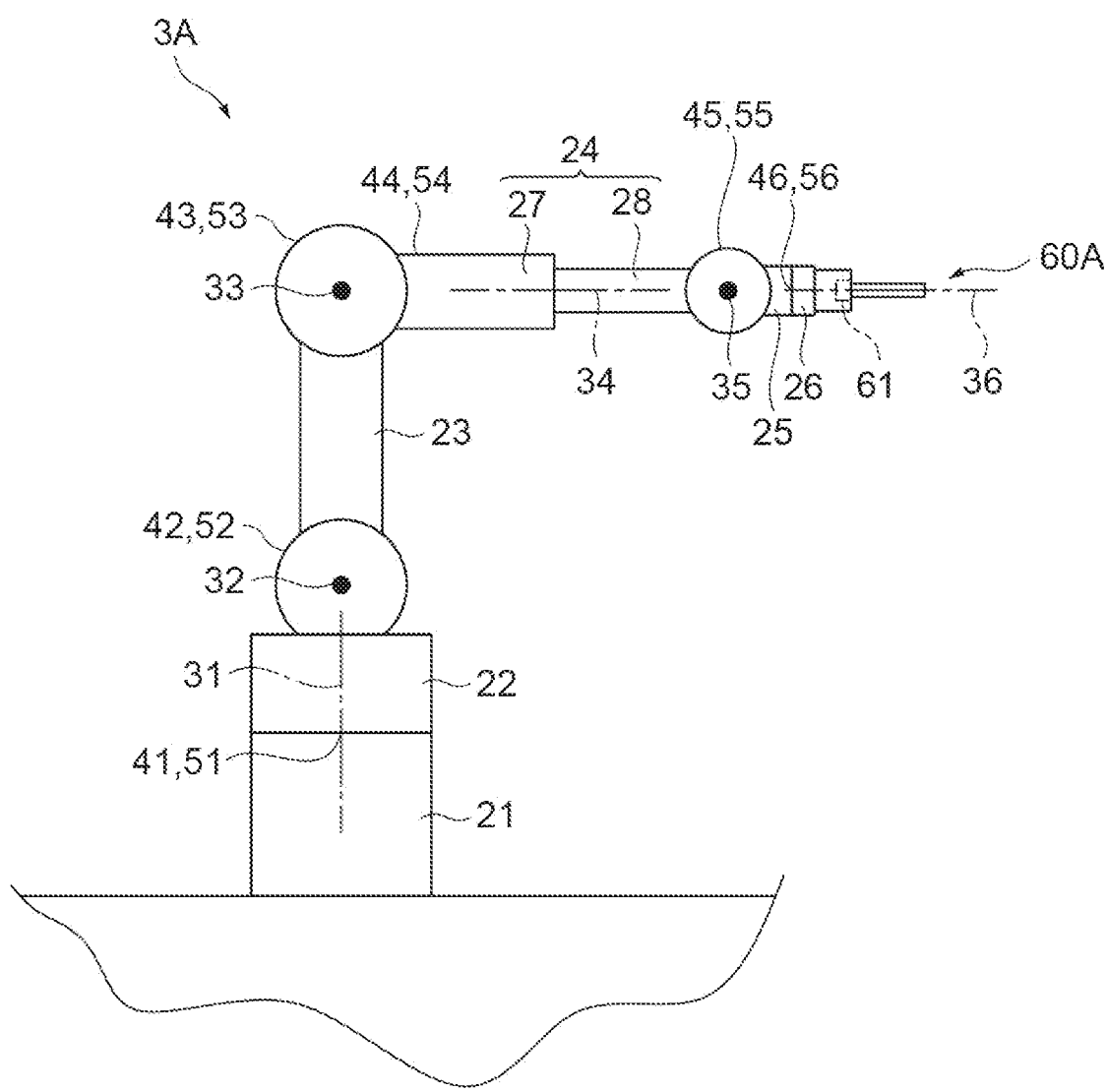
FIG. 2 is a schematic diagram illustrating an example configuration of a robot.

As illustrated in FIG. 2, the machine 3A includes, for example, a base part 21, a pivoting part 22, a first arm 23, a second arm 24, a wrist part 25, a tip part 26, actuators 51, 52, 53, 54, 55, and 56, and the tool 60A. The base part 21 is installed on a floor surface or the like of a work area. The pivoting part 22 is mounted on the base part 21 so as to be rotatable around a vertical axis 31. For example, the machine 3A has a joint 41 that mounts the pivoting part 22 to the base part 21 so as to be rotatable around the axis 31. The first arm 23 is connected to the pivoting part 22 so as to be rotatable around an axis 32 intersecting (for example, is orthogonal to) the axis 31. For example, the machine 3A has a joint 42 that connects the first arm 23 to the pivoting part 22 so as to be rotatable around the axis 32. The intersecting includes being in a twisted relationship like so-called three-dimensional crossing. The same applies to the following description. The first arm 23 extends from the pivoting part 22 along one direction intersecting (for example, orthogonal to) the axis 32.

The second arm 24 is connected to an end of the first arm 23 so as to be rotatable around an axis 33 parallel to the axis 32. For example, the machine 3A has a joint 43 that connects the second arm 24 to the first arm 23 so as to be rotatable around the axis 33. The second arm 24 includes an arm base 27 extending from the end of the first arm 23 along one direction intersecting (for example, is orthogonal to) the axis 33, and an arm end 28 further extending from an end of the arm base 27 along the same direction. The arm end 28 is rotatable around an axis 34 with respect to the arm base 27. The axis 34 intersects (e.g., is orthogonal to) the axis 33. For example, the machine 3A has a joint 44 that connects the arm end 28 to the arm base 27 so as to be rotatable around the axis 34.

The wrist part 25 is connected to an end portion of the arm end 28 so as to be rotatable around an axis 35 intersecting (for example, is orthogonal to) the axis 34. For example, the machine 3A has a joint 45 that connects the wrist part 25 to the arm end 28 so as to be rotatable around the axis 35. The wrist part 25 extends from the end portion of the arm end 28 along one direction intersecting (for example, is orthogonal to) the axis 35. The tip part 26 is connected to an end portion of the wrist part 25 so as to be rotatable around an axis 36 intersecting (for example, orthogonal to) the axis 35. For example, the machine 3A has a joint 46 that connects the tip part 26 to the wrist part 25 so as to be rotatable around the axis 36.

The actuators 51, 52, 53, 54, 55, and 56 drive the joints 41, 42, 43, 44, 45, and 46. Each of the actuators 51, 52, 53, 54, 55, and 56 includes, for example, an electric motor and a transmission unit (for example, a speed reducer) that transmits the power of the electric motor to the joints 41, 42, 43, 44, 45, and 46. For example, the actuator 51 drives the joint 41 to rotate the pivoting part 22 about the axis 31. The actuator 52 drives the joint 42 to rotate the first arm 23 about the axis 32. The actuator 53 drives the joint 43 to rotate the second arm 24 about the axis 33. The actuator 54 drives the joint 44 to rotate the arm end 28 about the axis 34. The actuator 55 drives the joint 45 to rotate the wrist part 25 about the axis 35. The actuator 56 drives the joint 46 to rotate the tip part 26 about the axis 36.

The actuators 51, 52, 53, 54, 55, and 56 drive the joints 41, 42, 43, 44, 45, and 46 to freely adjust the position and posture of the tip part 26. The tool 60A is a tool for screw fastening and is fixed to the tip part 26. Accordingly, the position and posture of the tool 60A change in accordance with the change in the position and posture of the tip part 26. The tool 60A may comprise a torque sensor 61 for detecting torque of the screw fastening.

Figure 3:
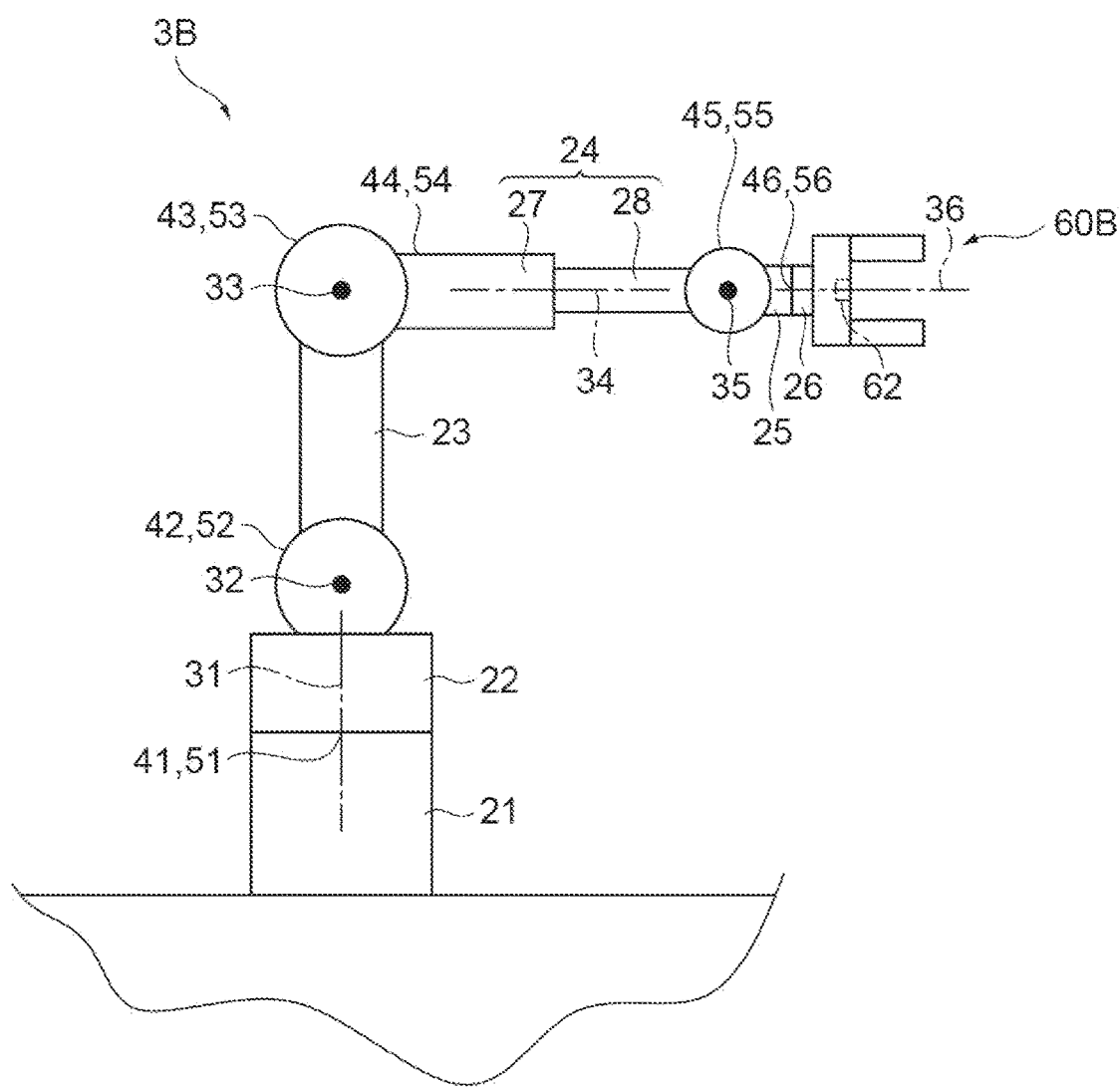
FIG. 3 is a schematic diagram illustrating an example configuration of a robot.

As illustrated in FIG. 3, the machine 3B includes a base part 21, a pivoting part 22, a first arm 23, a second arm 24, a wrist part 25, a tip part 26, actuators 51, 52, 53, 54, 55, and 56 and the tool 60B. The base part 21, the pivoting part 22, the first arm 23, the second arm 24, the wrist part 25, the tip part 26, and actuators 51, 52, 53, 54, 55, and 56 are similar to those of the machine 3A. Also, in the machine 3B, the actuators 51, 52, 53, 54, 55, and 56 drive the joints 41, 42, 43, 44, 45, and 46 to freely adjust the position and posture of the tip part 26. The tool 60B is a robot hand that grips the workpiece 90, and is fixed to the tip part 26. Accordingly, the position and posture of the tool 60B change in accordance with the change in the position and posture of the tip part 26. The tool 60B may include a grip sensor 62 that detects whether or not the workpiece 90 is held.

Returning to FIG. 1, The controller 100 is communicable with other controllers (e.g., the controllers 200A, 200B, and 300) via a communication network 900 such as a local area network. Although the controller 100, the controllers 200A, 200B, and 300, and the simulation device 400 are connected via one communication network 900 in the drawing, the controller 100 may be connected to the controllers 200A, 200B, and 300, and the simulation device 400 via a plurality of communication networks. For example, the controller 100 may be connected to the controllers 200A and 200B via a communication network for control, and may be connected to the controller 300 and the simulation device 400 via a communication network separate from the communication network for control. "Connected" here includes both connected by wired communication and connected by wireless communication.

For example, the controller 100 is a host controller and controls the machines 3A and 3B (local machines) via a plurality of controllers 200A and 200B (local controllers).

The controller 100 further controls the machine 2. As in the case where the controllers 200A and 200B are interposed between the controller 100 and the machines 3A and 3B, a local controller that controls the machine 2 based on commands from the controller 100 may be interposed between the controller 100 and the machine 2.

The controller 200A is communicable with other controllers (e.g., the controllers 100, 200B, and 300) via the communication network 900. The controller 200A controls the machine 3A based on commands from the controller 100. The controller 200B is communicable with other controllers (e.g., the controllers 100, 200A, and 300) via the communication network 900. The controller 200B controls the machine 3B based on commands from the controller 100.

The controller 300 is a terminal device for performing various settings for controllers 100, 200A, and 200B via the communication network 900. Examples of various settings for the controllers 100, 200A, and 200B include setting of various control parameters such as control gains.

The simulation device 400 is a device that simulates operations of the machine 2 and the machines 3A and 3B and environmental changes based on operations of these machines (for example, movement of the workpiece 90).

Simulation means that operations of the machine 2 and the machines 3A and 3B and environmental changes based on operations of these machines are simulated by numerical calculation without actually operating the machine 2 and the machines 3A and 3B.

Figure 4:
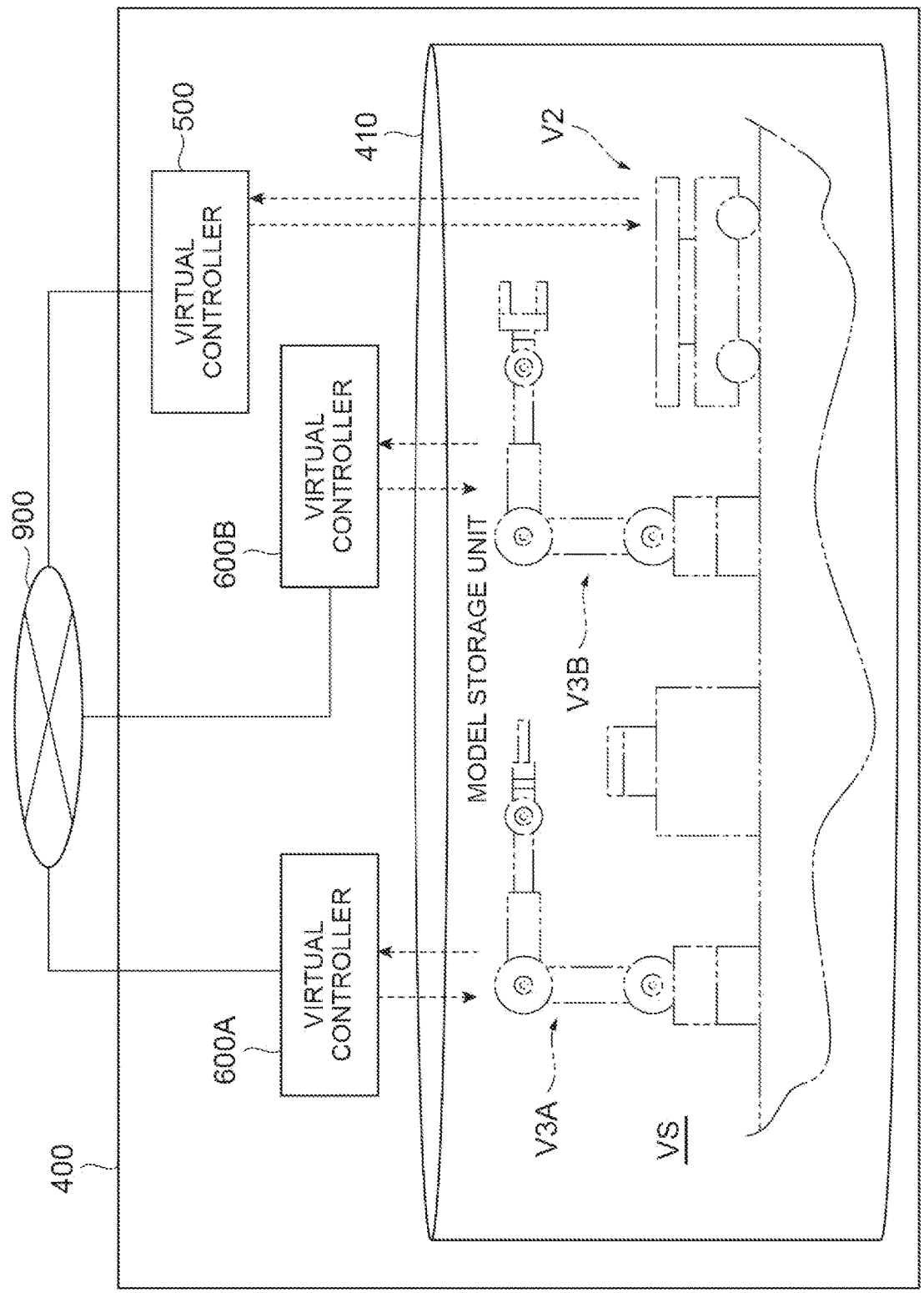
FIG. 4 is a schematic diagram illustrating an example configuration of a simulation device.

As illustrated in FIG. 4, the simulation device 400 includes a model storage unit 410, a virtual controller 500, and virtual controllers 600A and 600B. The model storage unit 410 stores a three-dimensional model of the machine 2, the machines 3A and 3B, and their surrounding environment. The three-dimensional model is numerical data representing a three-dimensional structure of the machine 2, the machines 3A and 3B, and their surrounding environment by three-dimensional coordinates in a virtual space VS. The virtual space VS is a virtual space in which the machine 2 and the machines 3A and 3B do not actually exist. On the other hand, a space in which the machine 2, the machines 3A, and 3B actually exist is hereinafter referred to as "a real space RS".

The virtual controller 500 is a virtual host controller, and controls a virtual machine V3A and a virtual machine V3B via a plurality of virtual controllers 600A and 600B (virtual local controllers), respectively. The virtual machine V3A and the virtual machine V3B are numerical values representing simulation results of operations of the machines 3A and 3B, respectively, and virtually operate in the virtual space VS so as to simulate the operations of the machines 3A and 3B in the real space RS.

The virtual controller 500 further controls a virtual machine V2. The virtual machine V2 represents a simulation result of the operation of the machine 2, and virtually operates in the virtual space VS so as to simulate the operation of the machine 2 in the real space RS. As in the case where the virtual controllers 600A and 600B are interposed between the virtual controller 500 and the virtual machine V3A and the virtual machine V3B, a virtual local controller that controls the virtual machine V2 based on a command from the virtual controller 500 may be interposed between the virtual controller 500 and the virtual machine V2.

For example, the virtual controller 500 sequentially calculates an operation amount of a movable part (the automatic guided vehicle 12) of the machine 2 in accordance with the elapse of time based on a program for causing the controller 100 to operate the machine 2. The virtual controller 500 calculates the virtual machine V2 after the operation of the movable part based on the operation amount of the movable part of the machine 2 and the three-dimensional model every time the operation amount of the movable part of the machine 2 is calculated.

The virtual controller 600A controls the virtual machine V3A based on commands from the virtual controller 500. For example, the virtual controller 600A operates the virtual machine V3A in the virtual space VS based on commands from the virtual controller 500. For example, the virtual controller 600A sequentially calculates the operation amount of the movable part (the joints 41, 42, 43, 44, 45, and 46) of the machine 3A in accordance with the elapse of time based on the commands from the virtual controller 500 and the program for operating the machine 3A. The virtual controller 600A calculates the virtual machine V3A after the operation of the movable part based on the operation amount of the movable part of the machine 3A and the three-dimensional model every time the operation amount of the movable part of the machine 3A is calculated.

The virtual controller 600B controls the virtual machine V3B based on a command from the virtual controller 500. For example, the virtual controller 600B operates the virtual machine V3B in the virtual space VS based on commands from the virtual controller 500. For example, the virtual controller 600B sequentially calculates the operation amount of the movable part (the joints 41, 42, 43, 44, 45, and 46) of the machine 3B in accordance with the elapse of time based on the commands from the virtual controller 500 and the program for operating the machine 3B. The virtual controller 600B calculates the virtual machine V3B after the operation of the movable part based on the operation amount of the movable part of the machine 3B and the three-dimensional model every time the operation amount of the movable part of the machine 3B is calculated.

Here, the machine system 1 is configured to be able to operate by replacing at least a part of the controllers 100, 200A, and 200B with the virtual controllers 500, 600A, and 600B. For example, each of the virtual controllers 500, 600A, and 600B can communicate with the controllers 100, 200A, and 200B (other controllers) via the communication network 900. Accordingly, each of the controllers 100, 200A, and 200B can also communicate with the virtual controllers 500, 600A, and 600B (other controllers) via the communication network 900. As illustrated in FIG. 4, virtual controllers 500, 600A, and 600B may be configured to communicate with each other via the communication network 900.

The controller 100 is configured to be able to control the virtual machine V3A and the virtual machine V3B via virtual controllers 600A and 600B instead of controlling machines 3A and 3B via controllers 200A and 200B. The virtual controller 500 is configured to be able to control the machines 3A and 3B via the controllers 200A and 200B instead of controlling the virtual machine V3A and the virtual machine V3B via the virtual controllers 600A and 600B.

As described above, when the controllers 100, 200A, and 200B and the virtual controllers 500, 600A, and 600B can communicate with each other via the communication network 900, the controller 300 may be configured to perform various settings for the virtual controllers 500, 600A, and 600B via the communication network 900 in the same manner as performing various settings for the controllers 100, 200A, and 200B via the communication network 900.

By the configuration in which at least a part of the controllers 100, 200A, and 200B can be replaced with the virtual controllers 500, 600A, and 600B, at least a part of the operations of the machines 2, 3A, and 3B in the real space RS can be replaced with the operations of the virtual machines V2, V3A, and V3B in the virtual space VS to simulate the processing of the entire system. However, when at least a part of machines 2, 3A, and 3B is replaced with the virtual machines V2, V3A, and V3B, the operation of the machine system 1 may not be continued. For example, even if the operations of the machines 2, 3A, and 3B can be simulated by the operations of the virtual machines V2, V3A, and V3B, since the real space does not change with the operations of virtual machines V2, V3A, and V3B, a process based on the state of the real space may not be executed in any of controllers 100, 200A, and 200B, and the virtual controllers 500, 600A, and 600B.

On the other hand, each of the controllers 100, 200A, and 200B and the virtual controllers 500, 600A, and 600B may be configured to determine whether another controller controls a machine or a virtual machine corresponding to the machine and execute predetermined real processing when the other controller controls the machine and execute virtual processing at least partially different from real processing when the other controller controls the virtual machine. As described above, according to the configuration in which the processing content of the controller is changed depending on whether the control target of another controller is the machine or the virtual machine, the processing of the entire system may be efficiently simulated.

For example, the controllers 100, 200A, and 200B and the virtual controllers 500, 600A, and 600B may be configure to: execute a processing to operate a control object (for example, a first machine) in collaboration with a second machine controlled by the second controller in a real space; modify the processing in response to determining that, instead of controlling the second machine, the second controller controls a virtual second machine that simulates operations of the second machine in a virtual space; and execute the modified processing to operate the control object in collaboration with the virtual second machine that operates in the virtual space. Modifying the processing includes replacing the processing with a pre-modified processing.

Each of the controllers 100, 200A, and 200B, and the virtual controllers 500, 600A, and 600B may determine whether the second controller controls the second machine or controls the virtual second machine based on information received from the second controller.

For example, the information received from the second controller includes operation information of the second machine or the virtual second machine, and a flag indicating whether the other controller controls the second machine or the virtual second machine, and each of the controllers 100, 200A, and 200B and the virtual controllers 500, 600A, and 600B may be configured to: determine whether the other controller controls the second machine or the virtual second machine based on the flag; and execute the processing or the modified processing based on the operation information.

may determine whether the other controller controls the machine or the virtual machine based on the communication condition for receiving information from the other controller. For example, The other controller (a second controller) may be configured to: communicate with the controller 100 in a first communication condition while controlling the machine (a second machine); and communicate with the controller 100 in a second communication condition while controlling the virtual machine (a virtual second machine). The determination unit 111 may be configured to: determine the second controller controls the second machine in response to determining that the controller 100 communicates with the second controller in the first communication condition; and determine the second controller controls the virtual machine in response to determining that the controller 100 communicates with the second controller in the second communication condition.

Each of the controllers 100, 200A, and 200B and the virtual controllers 500, 600A, and 600B may be configured to: execute the processing based on a set of real data obtained from the real space; and modify the processing so that the modified processing can be executed without the set of real data.

The control object and the second machine operate on a workpiece, and the set of real data may include a status of the workpiece in the real space.

Each of the controllers 100, 200A, and 200B and the virtual controllers 500, 600A, and 600B may be configured to: modify the processing to supplement a set of virtual data instead of obtaining the set of real data; and execute the modified processing based on the supplemented set of virtual data.

Each of the controllers 100, 200A, and 200B and the virtual controllers 500, 600A, and 600B may be configured to modify the processing by ignoring the set of real data.

Each of the controllers 100, 200A, and 200B and the virtual controllers 500, 600A, and 600B may be configured to: extract a part of the processing executed based on a set of real data obtained from the real space; and modify the extracted part of the processing in response to determining that the second controller controls the virtual second machine.

Each of the controllers 100, 200A, and 200B and the virtual controllers 500, 600A, and 600B may be configured to: extract a part of the processing executed based on a set of real data obtained from the real space; generate a user interface indicating the extracted part of the processing; and modify the processing based on a user input to modify the extracted part of the processing.

Each of the controllers 100, 200A, and 200B and the virtual controllers 500, 600A, and 600B may be communicable with a third controller, and may be configured to: execute the processing to operate the first machine in collaboration with the second machine and a third machine controlled by the third controller in the real space; modify a first part of the processing in response to determining that the second controller controls the virtual second machine; modify a second part of the processing in response to determining that, instead of controlling the third machine, the third controller controls a virtual third machine that simulates operations of the third machine in the virtual space; and execute the modified processing including the modified first part and the modified second part to operate the first machine in the real space in collaboration with the virtual second machine and the virtual third machine that operate in the virtual space.

The control object may be a first machine that operates in the real space, or a virtual first machine that simulates operations of the first machine in the virtual space.

Furthermore, each of the controllers 100, 200A, and 200B and the virtual controllers 500, 600A, and 600B may be configured to determine whether the control target of itself is the machine or a virtual machine corresponding to the machine, and to execute real processing when controlling the machine and to execute virtual processing when controlling the virtual machine.

Each of the controllers 100, 200A, and 200B and the virtual controllers 500, 600A, and 600B may be configured to: modify a first part of the processing in response to determining that the controller controls the virtual first machine; modify a second part of the processing in response to determining that the second controller controls the virtual second machine; and execute the modified processing including the modified first part and the modified second part to operate the virtual first machine in collaboration with the virtual second machine in the virtual space.

Each of the controllers 100, 200A, and 200B and the virtual controllers 500, 600A, and 600B may be configured to transmit, to the second controller, notification information to notify the second controller whether the controller controls the first machine or the virtual first machine.

Figure 5:
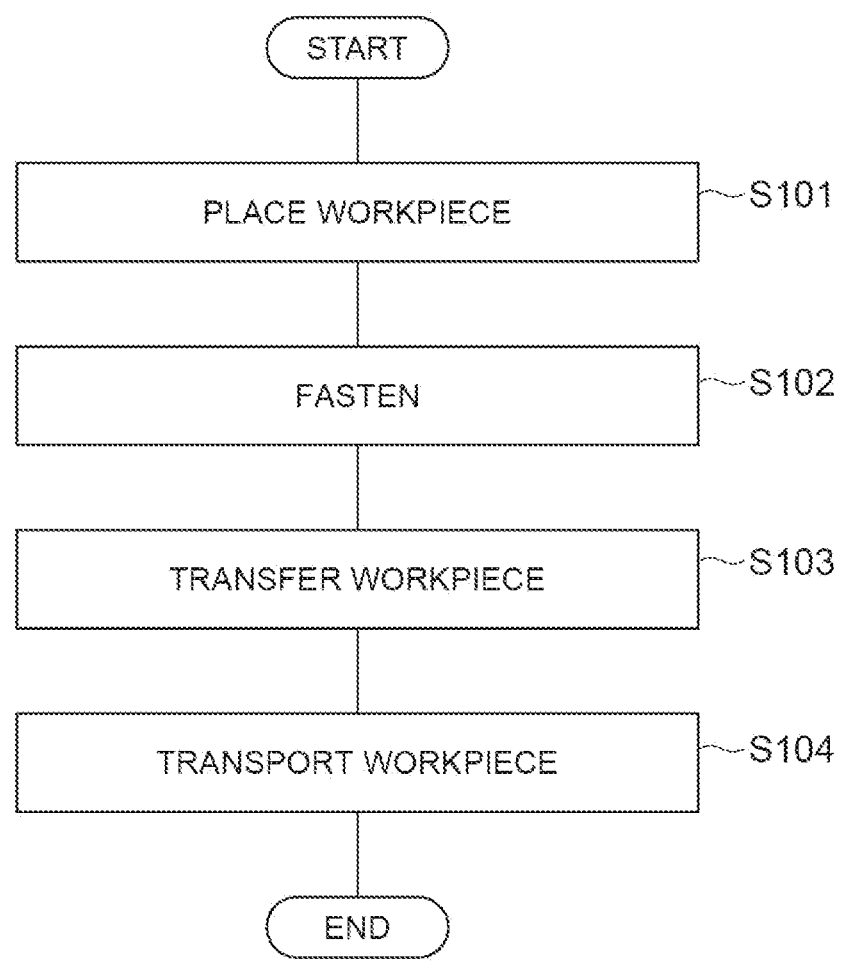
FIG. 5 is a flowchart illustrating an example operation of the machine system.

Hereinafter, examples of real processing and virtual processing will be described. FIG. 5 is a flowchart that illustrates the procedure performed by the machines 2, 3A, and 3B in the machine system 1. First, the machine 3B arranges the workpiece 90 at the working position P1 (S101). When the camera 5 confirms that the workpiece 90 is arranged at the working position P1, the machine 3A performs screw fastening (S102) on the workpiece 90 arranged at the working position P1. The machine 3B then transports the workpiece 90 from the working position P1 onto the loading table 11 (S103). When the load sensor 13 confirms that the workpiece 90 is placed on the loading table 11, the machine 2 transports the workpiece 90 (S104).

Figure 6:
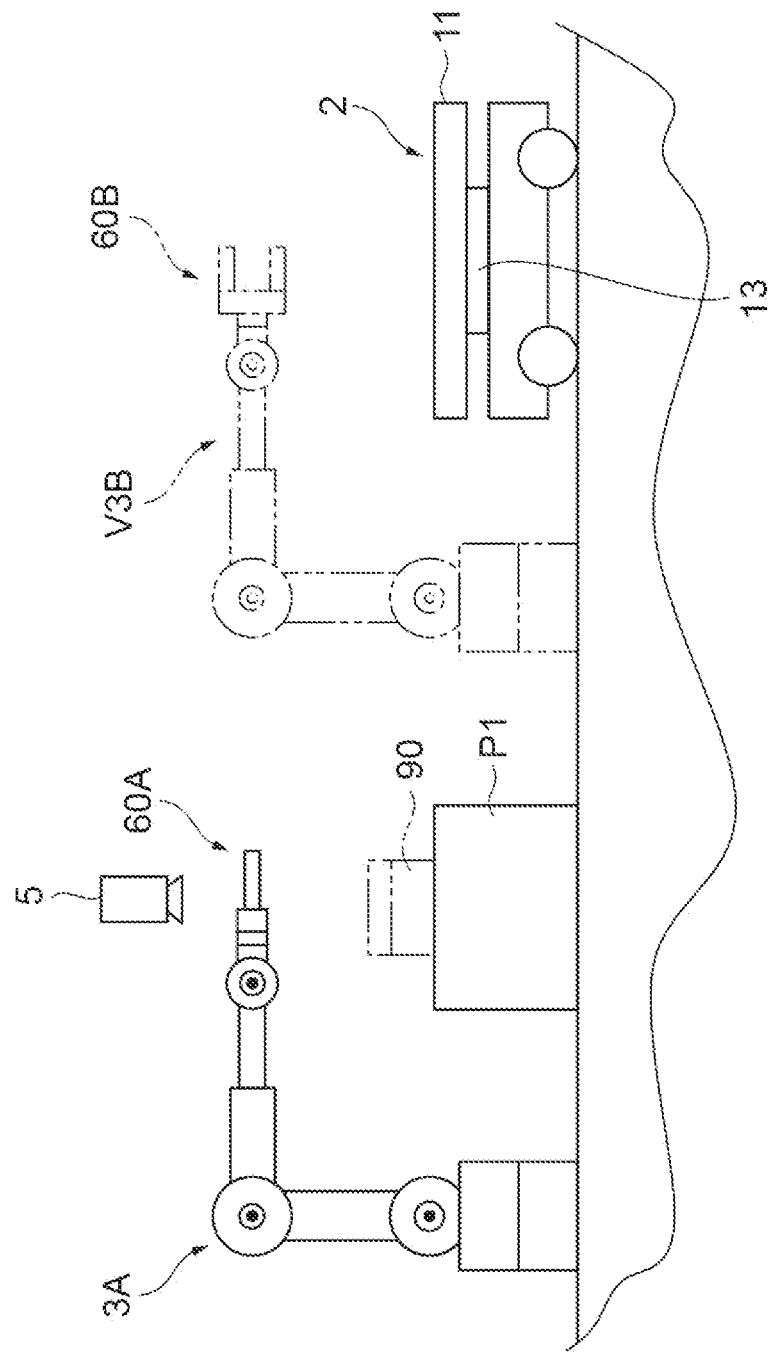
FIG. 6 is a schematic diagram illustrating a mixed example of a machine and a virtual machine.

FIG. 6 schematically illustrates a case where, among the controllers 100, 200A, and 200B, the controller 200B is replaced with the virtual controller 600B and thus the machine 2, the machine 3A, and the virtual machine V3B operate in a mixed manner. When the controller 200B controls the machine 3B, the controller 100 performs real processing including the following Process 1.

Process 1) Transmitting a start command of screw fastening (S102) to the controller 200A after the machine 3B completes the operation of placing the workpiece 90 at the working position P1 and the workpiece 90 is detected by the camera 5

In the case of FIG. 6, in the virtual space VS, the virtual controller 600B causes the virtual machine V3B to execute an operation of arranging the workpiece 90 at the working position P1, but in the real space RS, the workpiece 90 is not arranged at the working position P1, and thus the workpiece 90 is not detected by the camera 5. Accordingly, when the virtual controller 600B controls the virtual machine V3B, the controller 100 executes virtual processing including the following Process 2 instead of the Process 1.

Process 2) Transmitting a start command of screw fastening (S102) to the controller 200A without waiting for detection of the workpiece 90 by the camera 5 (by performing a process of skipping waiting) after the virtual machine V3B completes the operation of arranging the workpiece 90 in the working position P1 Accordingly, even in the case of FIG. 6, S102 is started.

When the controller 200B controls the machine 3B, the controller 200A executes real processing including the following Process 2-1.

Process 2-1) Controlling the machine 3A to complete the screw fastening with the tool 60A when the torque detected by the torque sensor 61 reaches a predetermined value after controlling the machine 3A to start the screw fastening (S102) with the tool 60A In the case of FIG. 6, since the workpiece 90 is not arranged at the working position P1 in the real space RS, the torque detected by the torque sensor 61 does not reach the predetermined value. Accordingly, when the virtual controller 600B controls the virtual machine V3B, the controller 200A executes virtual processing including the following Process 2-2 instead of the Process 2-1.

Process 2-2) Controlling the machine 3A to complete the screw fastening with the tool 60A when a predetermined time has elapsed after controlling the machine 3A to start the screw fastening (S102) with the tool 60A Accordingly, even in the case of FIG. 6, S102 is completed.

After S102, the controller 200B executes real processing including the following Process 3-1.

Process 3-1) Controlling the machine 3B to transport the workpiece 90 from the working position P1 onto the loading table 11 after the gripping of the workpiece 90 by the tool 60B is detected by the grip sensor 62 after controlling the machine 3B to execute an operation of gripping the workpiece 90 at the working position P1 with the tool 60B In the case of FIG. 6, in the virtual space VS, the virtual controller 600B causes the virtual machine V3B to execute an operation of gripping the workpiece 90 at the working position P1 with the tool 60B. However, since the workpiece 90 is not gripped with the tool 60B in the real space RS, gripping of the workpiece 90 with the tool 60B is not detected by the grip sensor 62. Accordingly, the virtual controller 600B executes virtual processing including the following Process 3-2 instead of the Process 3-1.

Process 3-2) Controlling the machine 3B to transport the workpiece 90 from the working position P1 onto the loading table 11 without waiting for detection of gripping by the grip sensor 62 (by executing a process of skipping waiting) after controlling the virtual machine V3B to execute an operation of gripping the workpiece 90 of the working position P1 by the tool 60B Accordingly, even in the case of FIG. 6, S103 is executed.

When the controller 200B controls the machine 3B, the controller 100 executes real processing including the following Process 4-1 after S103.

Process 4-1) Controlling the machine 2 to start transporting the workpiece 90 (S104) after the machine 3B completes the operation of transporting the workpiece 90 from the working position P1 onto the loading table 11 and the load sensor 13 detects the placement of the workpiece 90 on the loading table 11

In the case of FIG. 6, in the virtual space VS, the virtual controller 600B controls the virtual machine V3B to execute an operation of transporting the workpiece 90 from the working position P1 onto the loading table 11. However, since the workpiece 90 is not placed on the loading table 11 in the real space RS, and thus the placement of the workpiece 90 on the loading table 11 is not detected by the load sensor 13. Accordingly, the controller 100 executes virtual processing including the following Process 4-2 instead of the Process 4-1.

Process 4-2) Controlling the machine 2 to start transporting the workpiece 90 (S104) without waiting for the load sensor 13 to detect the arrangement of the workpiece 90 on the loading table 11 (by executing a process of skipping waiting) after the machine 3B completes the operation of transporting the workpiece 90 from the working position P1 to the loading table 11, Accordingly, even in the case of FIG. 6, S104 is executed.

Figure 7:
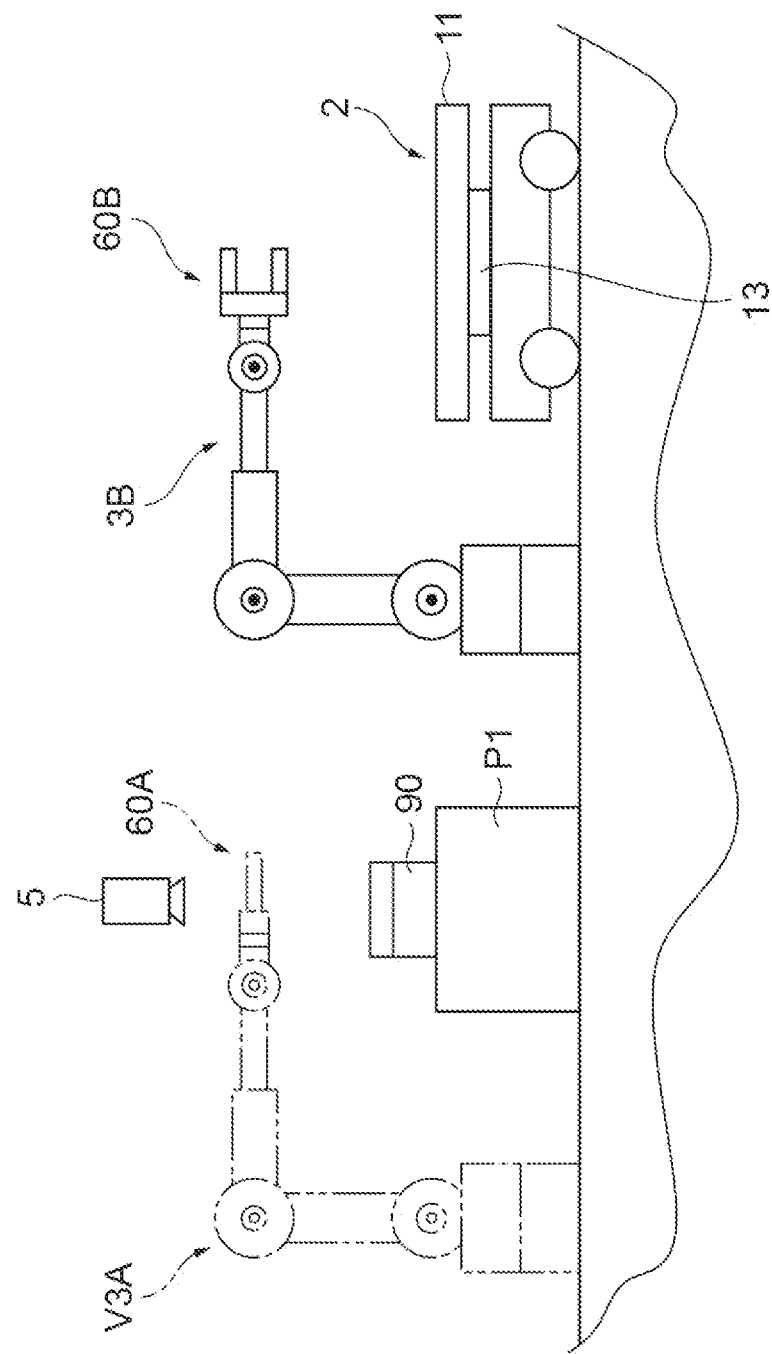
FIG. 7 is a schematic diagram illustrating another mixed example of a machine and a virtual machine.

FIG. 7 schematically illustrates a case where, among the controllers 100, 200A, and 200B, the controller 200A is replaced with the virtual controller 600A and thus the machine 2, the virtual machine V3A, and the machine 3B operate in a mixed manner. The controller 200A executes real processing including the following Process 5-1.

Process 5-1) Controlling the machine 3A to complete screw fastening with the tool 60A when the torque detected by the torque sensor 61 reaches a predetermined value after controlling the machine 3A to start the screw fastening (S102) by the tool 60A In the case of FIG. 7, in the virtual space VS, the virtual controller 600A causes the virtual machine V3A to execute an operation of performing screw fastening by the tool 60A. However, screw fastening by the tool 60A is not performed in the real space RS, and thus the torque detected by the torque sensor 61 does not reach a predetermined value. Accordingly, the virtual controller 600A executes virtual processing including the following Process 5-2 instead of the Process 5-1.

Process 5-2) Controlling the machine 3A to complete the screw fastening with the tool 60A when a predetermined time elapses after controlling the machine 3A to start the screw fastening (S102) with the tool 60A Accordingly, even in the case of FIG. 7, S102 is completed.

When the controller 200A controls the machine 3A, the controller 200B executes real processing including the following Process 6-1 after S102.

Process 6-1) Controlling the machine 3B to transport the workpiece 90 from the working position P1 onto the loading table 11 after the gripping of the workpiece 90 by the tool 60B is detected by the grip sensor 62, the machine 3B is caused after controlling the machine 3B to execute an operation of gripping the workpiece 90 at the working position with the tool 60B In the case of FIG. 7, since the screw fastening with the tool 60A is not performed in the real space RS, the workpiece 90 may not be integrally transported. Therefore, when the virtual controller 600A controls the virtual machine V3A, the controller 200B executes virtual processing including the following Process 6-2 instead of the Process 6-1.

Process 6-2) Controlling the machine 3B to transport the workpiece 90 from the working position P1 onto the loading table 11 without controlling the virtual machine V3B to execute the operation of gripping the workpiece 90 at the working position P1 with the tool 60B (by executing the process of skipping gripping)

Accordingly, even in the case of FIG. 7, S103 is executed.

When the controller 200A controls the machine 3A, the controller 100 executes real processing including the following Process 7-1 after S103.

Process 7-1) Controlling the machine 2 to start transporting the workpiece 90 (S104) after the machine 3B completes the operation of transporting the workpiece 90 from the working position P1 onto the loading table 11 and the load sensor 13 detects the placement of the workpiece 90 on the loading table 11

In the case of FIG. 7, since the workpiece 90 is not placed on the loading table 11 in the real space RS, the arrangement of the workpiece 90 on the loading table 11 is not detected by the load sensor 13. Accordingly, the controller 100 executes virtual processing including the following Process 7-2 instead of the Process 7-1.

Process 7-2) Controlling the machine 2 to start transporting the workpiece 90 (S104) without waiting for the load sensor 13 to detect the placement of the workpiece 90 on the loading table 11 (by executing a process of skipping waiting) after the machine 3B completes the operation of transporting the workpiece 90 from the working position P1 onto the loading table 11

Accordingly, even in the case of FIG. 7, S104 is executed.

Figure 8:
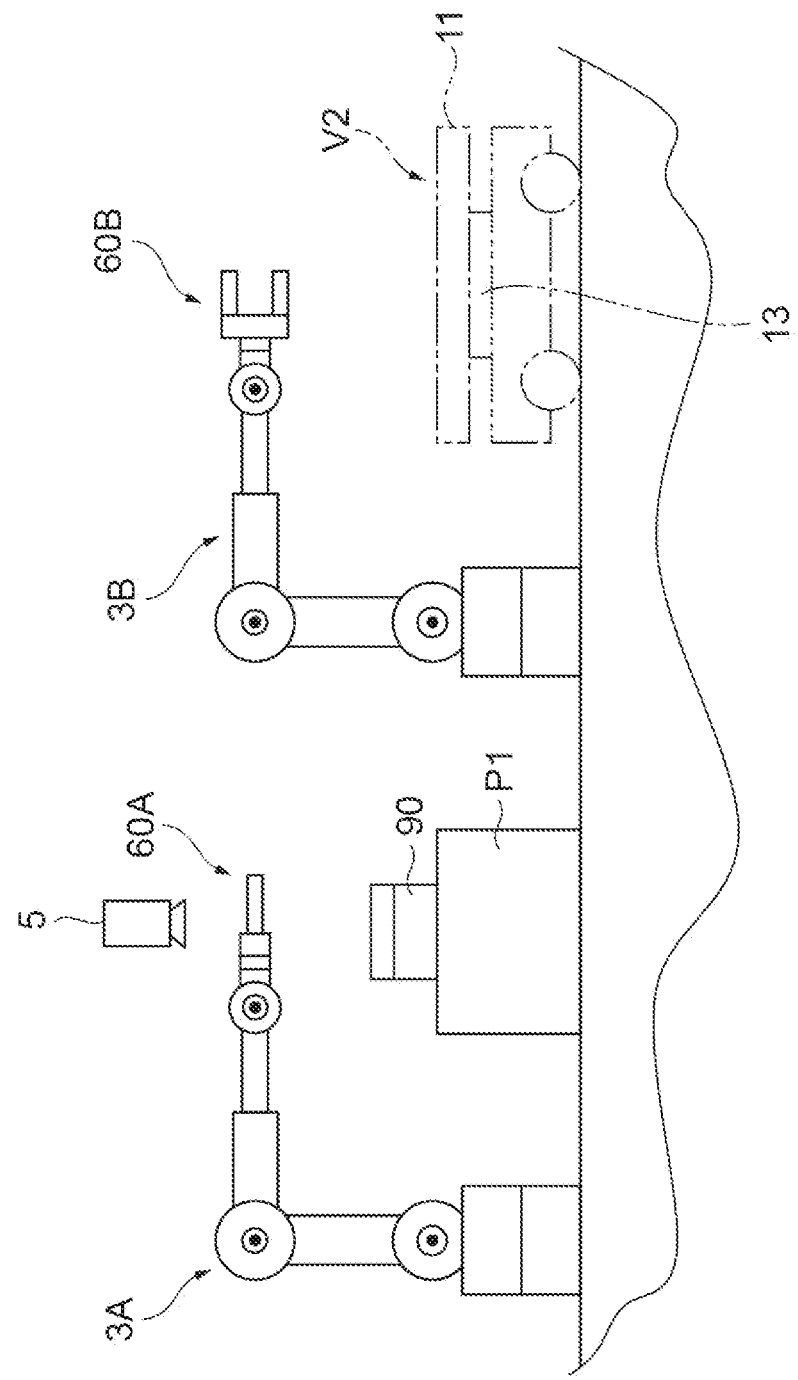
FIG. 8 is a schematic diagram illustrating yet another mixed example of a machine and a virtual machine.

FIG. 8 schematically illustrates a case where, among the controllers 100, 200A, and 200B, the controller 100 is replaced with the virtual controller 500 and thus the virtual machine V2, the machine 3A, and the machine 3B operate in a mixed manner. When the controller 100 controls the machine 2, the controller 200B executes real processing including the following Process 8-1 after S102.

Process 8-1) Controlling the machine 3B to transport the workpiece 90 from the working position P1 onto the loading table 11 after the gripping of the workpiece 90 with the tool 60B is detected by the grip sensor 62 after controlling the machine 3B to execute an operation of gripping the workpiece 90 at the working position P1 with the tool 60B In the case of FIG. 8, the workpiece 90 cannot be placed onto the loading table 11 in the real space RS. Accordingly, when the virtual controller 500 controls the virtual machine V2, the controller 200B executes virtual processing including the following Process 8-2 instead of the Process 8-1.

Process 8-2) Controlling the machine 3B to transport the workpiece 90 from the working position P1 onto the loading table 11 without controlling the virtual machine V3B to execute the operation of gripping the workpiece 90 at the working position P1 with the tool 60B (by executing the process of skipping gripping)

Accordingly, even in the case of FIG. 8, S103 is executed.

After S103, the controller 100 executes real processing including the following Process 9-1.

Process 9-1) Controlling the machine 2 to start transporting workpiece 90 (S104) after the machine 3B completes the operation of transporting the workpiece 90 from the working position P1 onto the loading table 11 and the load sensor 13 detects the placement of the workpiece 90 on the loading table 11, the transport (S104) of the workpiece 90 by the machine 2 is started In the case of FIG. 8, since the workpiece 90 is not placed on the loading table 11 in the real space RS, the placement of the workpiece 90 on the loading table 11 is not detected by the load sensor 13. Accordingly, the virtual controller 500 executes virtual processing including the following Process 9-2 instead of the above Process 9-1.

Process 9-2) Controlling the machine 2 to start transporting workpiece 90 (S104) without waiting for the load sensor 13 to detect the placement of the workpiece 90 on the loading table 11 (by executing a process of skipping waiting) after the machine 3B completes the operation of transporting the workpiece 90 from the working position P1 onto the loading table 11

Accordingly, even in the case of FIG. 8, S104 is executed.

Hereinafter, example configurations of the controllers 100, 200A, and 200B, the virtual controllers 500, 600A, and 600B, and the controller 300 will be described in more detail.

Host Controller

The controller 100 is a host controller that can communicate with a plurality of controllers 200A, 200B, 600A, and 600B (local controllers) and controls the machines 3A and 3B and the virtual machines V3A, and V3B via the plurality of local controllers, respectively.

Figure 9:
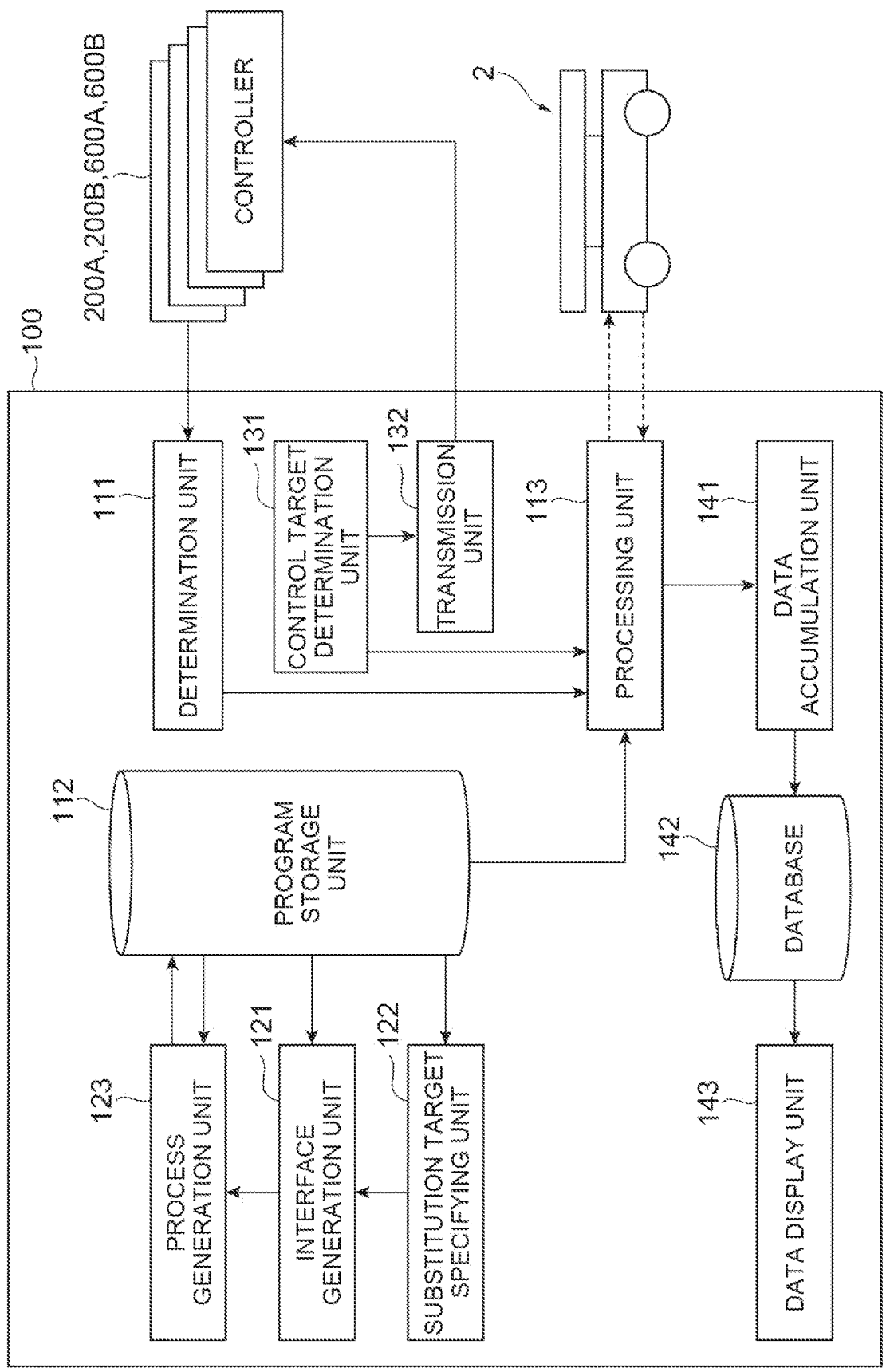
FIG. 9 is a block diagram illustrating an example functional configuration of a host controller.

As illustrated in FIG. 9, the controller 100 includes a determination unit 111, a program storage unit 112, and a processing unit 113 as functional configurations (hereinafter referred to as a "functional block"). The determination unit 111 determines whether another controller controls the machine or controls the virtual machine corresponding to the machine. The determination unit 111 may determine whether the other controller controls the machine or the virtual machine based on information received from the other controller. The information received from the other controller may include control information in the other controller and a flag indicating whether the other controller controls the machine or controls the virtual machine, and the determination unit 111 may determine whether the other controller controls the machine or the virtual machine based on the flag.

An example of the flag is a numerical value that changes depending on whether the other controller controls the machine or the virtual machine. In more detail, the flag may be "1" when the other controller controls the machine, and may be "0" when the other controller controls the virtual machine. The flag may be "0" when the other controller controls the machine, and may be "1" when the other controller controls the virtual machine. The same applies to flags in the following description of other controllers.

The information may include the flag if the other controller controls the machine and may not include the flag if the other controller controls the virtual machine. Also the information may include the flag if the other controller controls the virtual machine and may not include the flag if the other controller controls the machine. The determination unit 111 may determine whether the other controller controls the machine or the virtual machine based on whether the information includes the flag. As described above, determining whether the other controller controls the machine or the virtual machine based on whether the information includes the flag is also an example of determining whether the other controller controls the machine or the virtual machine based on the flag. The same applies to flags in the following description of other controllers.

The configuration of the control information may vary depending on whether the other controller controls the machine or the virtual machine. The determination unit 111 may determine whether the other controller controls the machine or the virtual machine based on the control information.

For example, in the FIG. 5 example, when the controller 200B controls the machine 3B, the information that the controller 100 receives from the controller 200B may include the following control information.

Control Information 1) Information indicating that the machine 3B has completed the operation of transporting the workpiece 90 to the working position P1 and that the grip sensor 62 has detected the release of the grip of the workpiece 90 with the tool 60B On the other hand, when the virtual controller 600B controls the virtual machine V3B, the information received by the controller 100 from the virtual controller 600B may include the following control information.

Control Information V1) Information indicating that the virtual machine V3B has completed the operation of transporting the workpiece 90 to the working position P1

The Control Information 1 and Control Information V1 are different from each other in whether or not "that the grip sensor 62 has detected the release of the grip of the workpiece 90 with the tool 60B" is included. In such a case, the determination unit 111 determines that the controller 200B controls the machine 3B based on the fact that "the grip sensor 62 has detected the release of the grip of the workpiece 90 with the tool 60B" being included in the control information. On the other hand, the determination unit 111 determines that the virtual controller 600B controls the virtual machine V3B based on the fact that "the grip sensor 62 has detected the release of the grip of the workpiece 90 with the tool 60B" is not included in the control information.

In addition, when the controller 200A controls the machine 3A, information received by the controller 100 from the controller 200A may include the following control information.

Control Information 2) Information indicating that the machine 3A has completed the screw fastening operation with the tool 60A and the torque detected by the torque sensor 61 at the completion of the screw fastening operation On the other hand, when the virtual controller 600A controls the virtual machine V3A, the information received by the controller 100 from the virtual controller 600A may include the following control information.

Control Information V2) Information indicating that the machine 3A has completed the screw fastening operation with the tool 60A.

The Control Information 2 differs from the Control Information V2 in whether or not "torque detected by the torque sensor 61" is included. In such a case, the determination unit 111 determines that the controller 200A controls the machine 3A based on the fact that "torque detected by the torque sensor 61" is included in the control information. On the other hand, the determination unit 111 determines that the virtual controller 600A controls the virtual machine V3A based on the fact that "torque detected by the torque sensor 61" is not included in the control information.

It is conceivable that the control information is encrypted when the other controller controls the machine and that the control information is not encrypted when the other controller controls the virtual machine. The determination unit 111 may determine whether the other controller controls the machine or the virtual machine based on whether or not the control information is encrypted.

A communication condition for receiving information from the other controller may be different depending on whether the other controller controls the machine or the virtual machine. Examples of differences in communication conditions include differences in communication delay times, differences in ports used for communication, and the like. When the communication condition for receiving information from the other controller is different depending on whether the other controller controls the machine or the virtual machine, the determination unit 111 may determine whether the other controller controls the machine or the virtual machine based on the communication condition for receiving information from the other controller.

The program storage unit 112 stores a predetermined real program. The real program is a program that causes the controller 100 to execute predetermined real processing when the other controller controls the machine and the own controller controls the machine. The program storage unit 112 further stores a virtual modification program that causes the controller 100 to execute virtual processing obtained by modifying at least a part of the real processing when the other controller controls the virtual machine.

In the FIG. 5 example, the real program stored by the program storage unit 112 may include the following processing instructions.

Real Processing Instruction 1) Transmitting a start instruction of screw fastening (S102) to the controller 200A after the machine 3B completes the operation of placing the workpiece 90 at the working position P1 and the workpiece 90 is detected by the camera 5

Real Processing Instruction 2) Controlling the machine 2 to start transporting the workpiece 90 (S104) after the machine 3B completes the operation of transporting the workpiece 90 from the working position P1 onto the loading table 11 and the load sensor 13 detects the placement of the workpiece 90 on the loading table 11

The virtual processing may include supplementary processing that compensates for a difference between real information obtained based on the operation of the machine and virtual information obtained based on the operation of the virtual machine. The virtual processing may include supplementary processing including processing for supplementing a difference between real information and virtual information with predetermined data.

For example, the virtual modification program may include the following supplementary processing instructions.

Supplementary Processing Instruction 1) Generating first supplementary data in the Real Processing Instruction 1 to simulatively indicate that the workpiece 90 has been detected by the camera 5 when the virtual controller 600B controls the virtual machine V3B Supplementary Processing Instruction 2) Generating second supplementary data in the Real Processing Instruction 2 to simulatively indicate that the placement of the workpiece 90 on the loading table 11 is detected by the load sensor 13 when the virtual controller 600B controls the virtual machine V3B Supplementary Processing Instruction 3) Generating the above-described second supplementary data in the Real Processing Instruction 2 when the virtual controller 600A controls the virtual machine V3A

Supplementary Processing Instruction 4) Generating the above-described second supplementary data in the Real Processing Instruction 2 when the own controller controls the virtual machine V2

The real information includes information (first detection information) indicating that the workpiece 90 is detected by the camera 5 and information (second detection information) indicating that the placement of the workpiece 90 on the loading table 11 is detected by the load sensor 13. The virtual information when the virtual controller 600B controls the virtual machine V3B does not include either the first detection information or the second detection information. On the other hand, the first detection information is supplemented by generating the first supplementary data by the supplementary processing according to the Supplementary Processing Instruction 1. Further, the second detection information is supplemented by generating the second supplementary data by the supplementary processing according to the Supplementary Processing Instruction 2.

the virtual information when the virtual controller 600A controls the virtual machine V3A does not include the second detection information. On the other hand, the second detection information is supplemented by generating the second supplementary data by the supplementary processing according to a Supplementary Processing Instruction 3.

The virtual information when the own controller controls the virtual machine V2 does not include the second detection information. On the other hand, the second detection information is supplemented by generating the second supplementary data by the supplementary processing according to the Supplementary Processing Instruction 4.

The virtual processing may include a skip processing for skipping at least a portion of the real processing. For example, the virtual modification program may include the following skip processing instruction.

Skip Processing Instruction 1) Executing, in the Real Processing Instruction 1, a first skip processing for skipping a process of waiting for detection of the workpiece 90 by the camera 5 when the virtual controller 600B controls the virtual machine V3B

Skip Processing Instruction 2) Executing, in the Real Processing Instruction 2, a second skip processing for skipping a process of waiting for the load sensor 13 to detect the arrangement of the workpiece 90 on the loading table 11 when the virtual controller 600B controls the virtual machine V3B

Skip Processing Instruction 3) Executing, in the Real Processing Instruction 2, the second skip processing when the virtual controller 600A controls the virtual machine V3A

Skip Processing Instruction 4) Executing, in the Real Processing Instruction 2, the second skip processing when the own controller controls the virtual machine V2

The processing unit 113 executes predetermined real processing when the other controller controls the machine, and executes virtual processing at least partially different from the real processing when the other controller controls the virtual machine.

The processing unit 113 may execute virtual processing in which a first part related to an operation of the machine 3A (a first machine) is different from the real processing when the virtual controller 600A (a first controller) controls the virtual machine V3A (a first virtual machine) and the controller 200B (a second controller) controls the machine 3B (a second machine). The processing unit 113 may execute virtual processing in which a second part related to an operation of the machine 3B (a second machine) is different from the real processing when the controller 200A (a first controller) controls the machine 3A and the virtual controller 600B (a second controller) controls the virtual machine V3B (a second virtual machine).

The processing unit 113 may execute virtual processing including supplementary processing for compensating for a difference between the real information and the virtual information. The processing unit 113 may execute supplementary processing including processing for compensating for a difference between real information and virtual information by predetermined information.

For example, when the controller 200A controls the machine 3A and the controller 200B controls the machine 3B, the processing unit 113 executes real processing based on a real program. In detail, the processing unit 113 transmits a start command of screw fastening to the controller 200A after the machine 3B completes the operation of placing the workpiece 90 at the working position P1 according to the Real Processing Instruction 1 and the workpiece 90 is detected by the camera 5. After the machine 3B completes the operation of transporting the workpiece 90 from the working position P1 onto the loading table 11 and the placement of the workpiece 90 on the loading table 11 is detected by the load sensor 13, the processing unit 113 causes the machine 2 to start transporting the workpiece 90 in accordance with the Real Processing Instruction 2.

When the virtual controller 600A, instead of the controller 200A, controls the virtual machine V3A, the processing unit 113 executes virtual processing in which a portion related to the operation of the machine 3A is different from real processing based on a real program and a virtual modification program. In detail, the processing unit 113 transmits a start command of screw fastening to the virtual controller 600A after the machine 3B completes the operation of placing the workpiece 90 at the working position P1 according to the Real Processing Instruction 1 and the workpiece 90 is detected by the camera 5. After the machine 3B completes the operation of transporting the workpiece 90 from the working position P1 onto the loading table 11, the processing unit 113 generates second supplementary data indicating that the placement of the workpiece 90 on the loading table 11 is detected by the load sensor 13, and starts the transport of the workpiece 90 by the machine 2 based on the second supplementary data according to the Real Processing Instruction 2 corrected based on the Supplementary Processing Instruction 3.

When the virtual controller 600B, instead of the controller 200B, controls the virtual machine V3B, the processing unit 113 executes virtual processing in which a portion related to the operation of the machine 3B is different from real processing based on a real program and a virtual modification program. In detail, the processing unit 113 generates first supplementary data indicating that the workpiece 90 is detected by the camera 5 after the virtual machine V3B completes the operation of placing the workpiece 90 at the working position P1 according to the Real Processing Instruction 1 modified based on the Supplementary Processing Instruction 1, and transmits a start command of screw fastening to the controller 200A based on the first supplementary data. After the machine 3B completes the operation of transporting the workpiece 90 from the working position P1 onto the loading table 11 according to the Real Processing Instruction 2 modified based on the Supplementary Processing Instruction 2, the processing unit 113 generates second supplementary data indicating that the arrangement of the workpiece 90 on the loading table 11 has been detected by the load sensor 13, and starts the transport of the workpiece 90 by the machine 2 based on the second supplementary data.

The processing unit 113 may execute virtual processing including a skip processing instruction for skipping at least a portion of real processing. As an example, when the virtual controller 600A controls the virtual machine V3A instead of the controller 200A, the processing unit 113 transmits a start command of screw fastening to the virtual controller 600A after the machine 3B completes the operation of arranging the workpiece 90 at the working position P1 in accordance with the Real Processing Instruction 1 and the workpiece 90 is detected by the camera 5. In addition, after the machine 3B completes the operation of transporting the workpiece 90 from the working position P1 to the loading table 11, the processing unit 113 causes the machine 2 to start transporting the workpiece 90 without waiting for the load sensor 13 to detect the placement of the workpiece 90 on the loading table 11 according to the Real Processing Instruction 2 modified based on the Skip Processing Instruction 3.

When the virtual controller 600B, instead of the controller 2B, controls the virtual machine V3B, the processing unit 113 transmits a start command of screw fastening to the controller 200A without waiting for the camera 5 to detect the workpiece 90 after the virtual machine V3B completes the operation of placing the workpiece 90 at the working position P1 according to the Real Processing Instruction 1 modified based on the Skip Processing Instruction 1. In addition, after the machine 3B completes the operation of transporting the workpiece 90 from the working position P1 onto the loading table 11, the processing unit 113 causes the machine 2 to start transporting the workpiece 90 without waiting for the load sensor 13 to detect the arrangement of the workpiece 90 on the loading table 11 according to the Real Processing Instruction 2 modified based on the Skip Processing Instruction 2.

The controller 100 may be configured to generate virtual processing based on input to a user interface. For example, the controller 100 further includes an interface generation unit 121, a substitution target specifying unit 122 (an extraction unit), and a process generation unit 123.

The interface generation unit 121 generates a user interface including a display part indicating one or more non-executable parts that cannot be executed when the other controller controls the virtual machine in real processing and an input part for inputting alternative processing to each of the one or more non-executable parts. For example, the interface generation unit 121 causes the controller 300 to display a user interface. Examples of the user interface will be described later in the description of the controller 300.

The substitution target specifying unit 122 specifies one or more non-executable parts based on a difference between the real information and the virtual information. For example, the substitution target specifying unit 122 specifies a portion waiting for the second detection information as a non-executable part based on the fact that the second detection information is not included in the virtual information when the virtual controller 600A controls the virtual machine V3A. Similarly, the substitution target specifying unit 122 specifies a portion waiting for the first detection information and the second detection information as a non-executable part based on the fact that the first detection information and the second detection information are not included in the virtual information when the virtual controller 600B controls the virtual machine V3B. The interface generation unit 121 causes the display part to display one or more non-executable parts specified by the substitution target specifying unit 122.

The process generation unit 123 generates virtual processing based on an input to the input part of the user interface. For example, the process generation unit 123 generates the above-described supplementary processing instruction or the skip processing instruction based on the input to the input part, and causes the program storage unit 112 to store the supplementary processing instruction or the skip processing instruction.

The controller 100 may be configured to generate supplementary processing based on a difference between the real information and the virtual information. For example, the process generation unit 123 may be configured to generate the supplementary processing based on a difference between real information and virtual information.

For example, the process generation unit 123 generates the Supplementary Processing Instruction 3 based on the fact that the second detection information is not included in the virtual information when the virtual controller 600A controls the virtual machine V3A, and stores the generated Supplementary Processing Instruction 3 in the program storage unit 112. Similarly, the process generation unit 123 generates the Supplementary Processing Instruction 1 and the Supplementary Processing Instruction 2 based on the fact that the first detection information and the second detection information are not included in the virtual information when the virtual controller 600B controls the virtual machine V3B, and stores the generated Supplementary Processing Instruction 1 and the Supplementary Processing Instruction 2 in the program storage unit 112.

The controller 100 may be configured to execute virtual processing even when the control target of the own controller is a virtual machine. For example, the controller 100 further includes a control target determination unit 131 and a transmission unit 132. The control target determination unit 131 unit determines whether the control target of the own controller is the machine (a subordinate machine) or the virtual machine (a subordinate virtual machine). For example, the control target determination unit 131 determines whether the control target of the own controller is the machine 2 or the virtual machine V2. For example, the control target determination unit 131 determines whether the control target of the own controller is the machine 2 or the virtual machine V2 based on whether the own controller is a virtual controller configured in the simulation device 400.

As will be described later, the controller 100 itself may be configured to execute a real mode for actually controlling the machine 2 and a virtual mode for controlling the virtual machine V2. The control target determination unit 131 may determine whether the control target of the own controller is the machine 2 or the virtual machine V2 based on which of the real mode and the virtual mode is selected.

The processing unit 113 executes real control processing when the control target of the own controller is the machine, and executes virtual control processing at least partially different from the real control processing when the control target of the own controller is a virtual machine. For example, when the other controller controls the virtual machine and the own controller controls a subordinate machine, the processing unit executes virtual processing in which an externally dependent part related to an operation of the machine (the machine controlled by the other controller) is different from real processing. This virtual processing is included in the above-described real control processing. When the other controller controls the machine and the own controller controls the subordinate virtual machine, the processing unit 113 may execute virtual processing in which the subordinate part related to the operation of the subordinate machine is different from real processing. This virtual processing is included in the above-described virtual control processing.

The transmission unit 132 transmits information to which the determination result by the control target determination unit 131 is added to the other controller. For example, the transmission unit 132 transmits, to the controller 200A or the virtual controller 600A, information obtained by adding a determination result (for example, the flag) by the control target determination unit 131 to a command (control information) for operating the machine 3A. In addition, the transmission unit 132 transmits information obtained by adding a determination result by the control target determination unit 131 to a command (control information) for operating the machine 3B to the controller 200B or the virtual controller 600B.

The controller 100 may be configured to collect and store the control data for the machine 2 and the machines 3A, 3B, V3A, and V3B. The control data includes control information sent from controllers 200A and 200B or virtual controllers 600A and 600B to the controller 100, control commands sent from the controller 100 to controllers 200A and 200B or virtual controllers 600A and 600B, control commands sent from the controller 100 to the machine 2, detection results by the camera 5, detection results by the torque sensor 61, detection results by the grip sensor 62, and the like. For example, the controller 100 includes a data accumulation unit 141, a database 142, and a data display unit 143. The data accumulation unit 141 unit accumulates control data of the machine 2 and the machines 3A, 3B, V3A, and V3B in the database 142 in time series. The data display unit 143 displays the control data accumulated in the database 142 on the controller 300 or the like.

The data accumulation unit 141 may include a determination result indicating whether the control target of the own controller is a subordinate machine or the subordinate virtual machine and a determination result indicating whether the control target of the other controller is the machine or a virtual machine into control data and accumulate the control data in the database 142. The data obtained in the real space RS and the data obtained in the virtual space VS may be distinguished, and the usability of the accumulated control data may be improved.

Robot Controller

Figure 10:
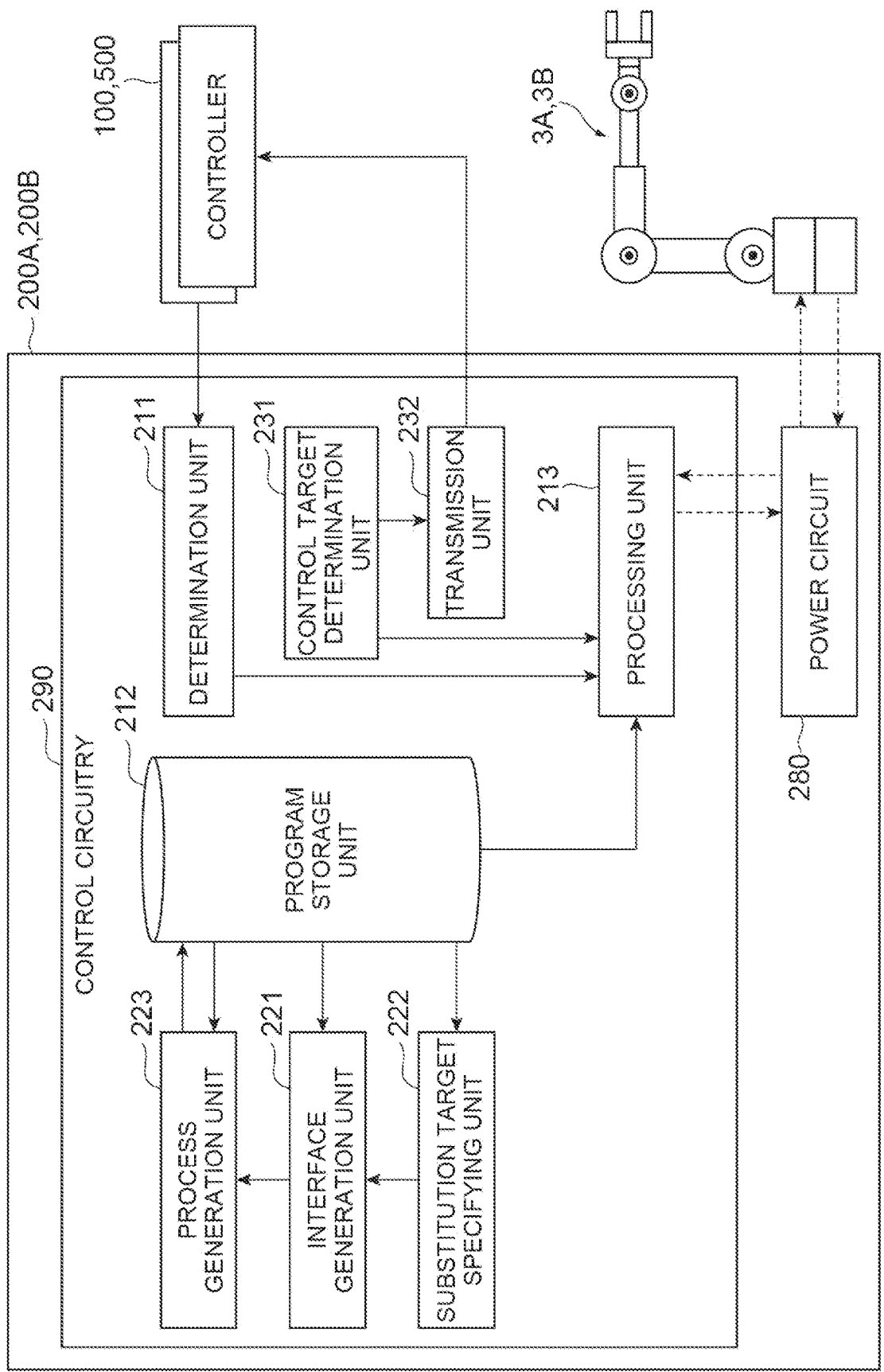
FIG. 10 is a block diagram illustrating an example functional configuration of a robot controller.

The controller 200A is a robot controller that controls the machine 3A based on commands from the controller 100, and the controller 200B is a robot controller that controls the machine 3B based on commands from the controller 100. As illustrated in FIG. 10, the controller 200A includes a power circuit 280 that supplies driving power to the machine 3A and control circuitry 290 that controls the power circuit 280. The control circuitry 290 includes a determination unit 211, a program storage unit 212, and a processing unit 213 as functional blocks.

The determination unit 211 determines whether the other controller controls the machine or controls the virtual machine corresponding to the machine. The determination unit 211 may determine whether the other controller controls the machine or the virtual machine based on information received from the other controller. The information received from the other controller may include control information in the other controller and a flag indicating whether the other controller controls the machine or the virtual machine, and the determination unit 211 may determine whether the other controller controls the machine or the virtual machine based on the flag.

The configuration of the control information may vary depending on whether the other controller controls the machine or a virtual machine. The determination unit 211 may determine whether the other controller controls the machine or the virtual machine based on the control information.

It is conceivable that the control information is encrypted when the other controller controls the machine, and that the control information is not encrypted when the other controller controls the virtual machine. The determination unit 211 may determine whether the other controller controls the machine or the virtual machine based on whether or not the control information is encrypted.

A communication condition for receiving information from the other controller may be different depending on whether the other controller controls the machine or the virtual machine. Examples of differences in communication conditions include differences in communication delay times, differences in ports used for communication, and the like. When the communication condition for receiving information from the other controller is different depending on whether the other controller controls the machine or the virtual machine, the determination unit 211 may determine whether the other controller controls the machine or the virtual machine based on the communication condition for receiving information from the other controller. For example, The program storage unit 212 stores a predetermined real program. The real program is a program that causes the controller 200A to execute predetermined real processing when another controller controls the machine and the own controller controls the machine. The program storage unit 212 further stores a virtual modification program that causes a machine 200 to execute virtual processing obtained by modifying at least a part of the real processing when the other controller controls the virtual machine.

In the FIG. 5 example, the real program stored by the program storage unit 212 may include the following processing instructions.

Real Processing Instruction 2-1) Controlling the machine 3A to complete screw fastening with the tool 60A when the torque detected by the torque sensor 61 reaches a predetermined value after the machine 3A starts the screw fastening with the tool 60A

The virtual processing may include supplementary processing that compensates for a difference between real information obtained based on the operation of the machine and virtual information obtained based on the operation of the virtual machine. The virtual processing may include supplementary processing including processing for supplementing a difference between real information and virtual information with predetermined data.

For example, the virtual modification program may include the following supplementary processing instructions.

Supplementary Processing Instruction 2-1) Generating supplementary data to simulatively indicate that the torque detected by the torque sensor 61 has reached a predetermined value at a timing when a predetermined time has elapsed after the start of screw fastening with the tool 60A in the Real Processing Instruction 2-1 when the virtual controller 600B controls the virtual machine V3B Supplementary Processing Instruction 2-2) Generating the above-described supplementary data at a timing when a predetermined time elapses after the start of screw fastening by the tool 60A in the Real Processing Information 2-1 when the own controller controls the virtual machine V3A The real information includes information (detection information) indicating that the torque detected by the torque sensor 61 has reached a predetermined value. The detection information when the virtual controller 600B controls the virtual machine V3B and when the own controller controls the virtual machine V3A is not included in the virtual information. On the other hand, the detection information is supplemented by generating the supplementary data by the supplementary processing according to the Supplementary Processing Instruction 2-1 or the Supplementary Processing Instruction 2-2.

The virtual processing may include a skip processing for skipping at least a portion of the real processing. For example, the virtual modification program may include the following the skip processing instruction.

Skip Processing Instruction 2-1) Skipping a process of waiting for the torque detected by the torque sensor 61 to reach a predetermined value at a timing when a predetermined time elapses after the start of screw fastening by the tool 60A (skip processing instruction) in the Real Processing Instruction 2-1 when the virtual controller 600B controls the virtual machine V3B Skip Processing Instruction 2-2) Executing the above-described skip processing at a timing when a predetermined time elapses after the start of screw fastening by the tool 60A in the Real Processing Instruction 2-1 when the own controller controls the virtual machine V3A The processing unit 213 executes predetermined real processing when the other controller controls the machine, and executes virtual processing at least partially different from the real processing when the other controller controls the virtual machine. The processing unit 213 may execute virtual processing in which a first part related to an operation of the machine 3B (a first machine) is different from the real processing when the virtual controller 600B (a first controller) controls the virtual machine V3B (a first virtual machine) and the controller 100 (a second controller) controls the machine 2 (a second machine). The processing unit 213 may execute virtual processing in which a second part related to an operation of the machine 2 (second machine) is different from the real processing when the controller 200B (a first controller) controls the machine 3B and the virtual controller 500 (a second controller) controls the virtual machine V2 (a second virtual machine).

The processing unit 213 may execute virtual processing including supplementary processing for compensating for a difference between the real information and the virtual information. The processing unit 213 may execute supplementary processing including processing for compensating for a difference between real information and virtual information by predetermined information. The processing unit 213 may execute virtual processing including a skip processing instruction for skipping at least a portion of real processing.

For example, when the controller 200B controls the machine 3B and the controller 100 controls the machine 2, the processing unit 213 executes real processing based on a real program. In detail, the processing unit 213 controls the machine 3A to start screw fastening with the tool 60A according to the Real Processing Instruction 2-1, and then controls the machine 3A to complete screw fastening with the tool 60A when torque detected by the torque sensor 61 reaches a predetermined value.

When the virtual controller 600B, instead of the controller 200B, controls the virtual machine V3B, the processing unit 213 executes virtual processing in which a portion related to the operation of the machine 3B is different from real processing based on a real program and a virtual modification program. In detail, the processing unit 213 controls the machine 3A to start screw fastening by the tool 60A according to the Real Processing Instruction 2-1 corrected based on the Supplementary Processing Instruction 2-1, generates the supplementary data at a timing when a predetermined time elapses, and controls the machine 3A to complete screw fastening by the tool 60A based on the supplementary data.

The processing unit 213 may control the machine 3A to start screw fastening with the tool 60A according to the Real Processing Instruction 2-1 modified based on the Skip Processing Instruction 2-1, and then control the machine 3A to complete screw fastening by the tool 60A without waiting for the torque detected by the torque sensor 61 to reach a predetermined value at a timing when a predetermined time has elapsed.

The controller 200A may be configured to generate virtual processing based on input to a user interface. For example, the machine 200 further includes an interface generation unit 221, a substitution target specifying unit 222, and a process generation unit 223.

The interface generation unit 221 generates a user interface including a display part indicating one or more non-executable parts that cannot be executed when the other controller controls the virtual machine in real processing and an input part for inputting alternative processing to each of the one or more non-executable parts. For example, the interface generation unit 221 causes the controller 300 to display a user interface. Examples of the user interface will be described later in the description of the controller 300.

The substitution target specifying unit 222 specifies one or more non-executable parts based on a difference between the real information and the virtual information. For example, the substitution target specifying unit 222 specifies a portion waiting for the detection information as a non-executable part based on the fact that the detection information is not included in the virtual information when the virtual controller 600B controls the virtual machine V3B. The interface generation unit 221 causes the display part to display one or more non-executable parts specified by the substitution target specifying unit 222.

The process generation unit 223 generates virtual processing based on an input to the input part of the user interface. For example, the process generation unit 223 generates the above-described supplementary processing instruction or the skip processing instruction based on the input to the input part, and causes the program storage unit 112 to store the supplementary processing instruction or the skip processing instruction.

The controller 200A may be configured to generate supplementary processing based on a difference between the real information and the virtual information. For example, the process generation unit 223 may be configured to generate the supplementary processing based on a difference between real information and virtual information. For example, the process generation unit 223 generates the Supplementary Processing Instruction 2-1 based on the fact that the detection information is not included in the virtual information when the virtual controller 600B controls the virtual machine V3B, and stores the Supplementary Processing Instruction 2-1 in the program storage unit 112.

The controller 200A may be configured to execute virtual processing even when the control target of the own controller is a virtual machine. For example, the controller 200A further includes a control target determination unit 231 and a transmission unit 232. The control target determination unit 231 determines whether the control target of own controller is the machine (a subordinate machine) or the virtual machine (a subordinate virtual machine). For example, the control target determination unit 231 determines whether the control target of the own controller is the machine 3A or the virtual machine V3A. For example, the control target determination unit 231 determines whether the control target of the own controller is the machine 3A or the virtual machine V3A based on whether the own controller is a virtual controller configured in the simulation device 400.

As will be described later, the controller 200A itself may be configured to execute a real mode for actually controlling the machine 3A and a virtual mode for controlling the virtual machine V3A. The control target determination unit 231 may determine whether the control target of the own controller is the machine 3A or the virtual machine V3A based on which of the real mode and the virtual mode is selected.

The processing unit 213 executes real control processing when the control target of the own controller is the machine, and executes virtual control processing at least partially different from the real control processing when the control target of the own controller is a virtual machine. For example, when the other controller controls the virtual machine and the own controller controls a subordinate machine, the processing unit executes virtual processing in which an externally dependent part related to an operation of the machine (the machine controlled by the other controller) is different from real processing. This virtual processing is included in the above-described real control processing. When the other controller controls the machine and the own controller controls the subordinate virtual machine, the processing unit 213 may execute virtual processing in which the subordinate part related to the operation of the subordinate machine is different from the real processing. This virtual processing is included in the above-described virtual control processing.

As an example, when the own controller controls the subordinate virtual machine, the processing unit 213 controls the machine 3A to start screw fastening with the tool 60A according to the Real Processing Instruction 2-1 modified based on the Supplementary Processing Instruction 2-2, generates the supplementary data at a timing when a predetermined time elapses, and controls the machine 3A to complete screw fastening with the tool 60A based on the supplementary data.

The processing unit 213 may control the machine 3A to start screw fastening with the tool 60A in accordance with the Real Processing Instruction 2-1 modified based on the Skip Processing Instruction 2-2, and then control the machine 3A to complete screw fastening with the tool 60A without waiting for the torque detected by the torque sensor 61 to reach a predetermined value at a timing when a predetermined time has elapsed.

The transmission unit 232 transmits information to which the determination result by the control target determination unit 231 is added to another controller. For example, the transmission unit 232 transmits, to the controller 100 or the virtual controller 500, information obtained by adding a determination result (for example, the flag) by the control target determination unit 231 to information (control information) indicating an operation result of the machine 3A.

Similarly to the controller 200A, the controller 200B includes the power circuit 280 and the control circuitry 290. In the FIG. 5 example, the real program stored in the program storage unit 212 of the controller 200B may include the following processing instruction.

Real Processing Instruction 3-1) Controlling the machine 3B to execute an operation of gripping the workpiece 90 of the working position P1 by the tool 60B, and then controlling the machine 3B to execute an operation of transporting the workpiece 90 from the working position P1 onto the loading table 11 after the gripping of the workpiece 90 by the tool 60B is detected by the grip sensor 62

In addition, the virtual modification program may include the following supplementary processing instructions.

Supplementary Processing Instruction 3-1) Generating supplementary data indicating simulatively that the gripping of the workpiece 90 is detected by the grip sensor 62 in the Real Processing Instruction 2-1 when the virtual controller 600A controls the virtual machine V3A Supplementary Processing Instruction 3-2) Generating the above-described supplementary data in the Real Processing Instruction 2-1 when the virtual controller 500 controls the virtual machine V2

Supplementary Processing Instruction 3-3) Generating the above-described supplementary data in the Real Processing Instruction 2-1 when the own controller controls the virtual machine V3B The real information includes information (detection information) indicating that gripping of the workpiece 90 has been detected by the grip sensor 62. The detection information is not included in the virtual information when the virtual controller 600A controls the virtual machine V3A, when the virtual controller 500 controls the virtual machine V2, and when the own controller controls the virtual machine V3B. On the other hand, detection information is supplemented by generating supplementary data by supplementary processing according to the Supplementary Processing Instruction 3-1, the Supplementary Processing Instruction 3-2, or the Supplementary Processing Instruction 3-3.

The virtual processing may include a skip processing instruction for skipping at least a portion of the real processing. For example, the virtual modification program may include the following the skip processing instruction.

Skip Processing Instruction 3-1) Skipping a process of controlling the machine 3B to execute an operation of gripping the workpiece 90 at the working position P1 with the tool 60B (a first skip processing) in the Real Processing Instruction 3-1 when the virtual controller 600A controls the virtual machine V3A Skip Processing Instruction 3-2) Skipping processing for waiting for detection of gripping of the workpiece 90 by the grip sensor 62 (a second skip processing) in the Real Processing Instruction 3-1 after the first skip processing) when the virtual controller 600A controls the virtual machine V3A Skip processing Instruction 3-3) Executing the first skip processing in the Real Processing Instruction 3-1 when the virtual controller 500 controls the virtual machine V2

Skip Processing Instruction 3-4) Executing the second skip processing after the first skip processing in the Real Processing Instruction 3-1 when the virtual controller 500 controls the virtual machine V2

Skip Processing Instruction 3-5) Executing the second skip processing in the Real Processing Instruction 3-1 when the own controller controls the virtual machine V3B When the controller 200B controls the machine 3B and the controller 100 controls the machine 2, the processing unit 213 executes real processing based on the real program. In detail, the processing unit 213 controls the machine 3B to execute an operation of gripping the workpiece 90 at the working position P1 with the tool 60B according to the Real Processing Instruction 3-1, and then controls the machine 3B to transport the workpiece 90 from the working position P1 to the loading table 11 after the gripping of the workpiece 90 by the tool 60B is detected by the grip sensor 62.

When the virtual controller 600A, instead of the controller 200A, controls the virtual machine V3A, the processing unit 213 executes virtual processing in which a portion related to the operation of the machine 3A is different from real processing based on a real program and a virtual modification program. In detail, the processing unit 213 generates supplementary data without controlling the machine 3B to execute an operation of gripping the workpiece 90 at the working position P1 with the tool 60B, and controlling the machine 3B to execute an operation of transporting the workpiece 90 from the working position P1 onto the loading table 11 based on the supplementary data, according to the Real Processing Instruction 3-1 modified based on the Skip Processing Instruction 3-1 and the Supplementary Processing Instruction 3-1.

In accordance with the Real Processing Instruction 3-1 modified based on the Skip Processing Instruction 3-1 and the Skip Processing Instruction 3-2, the processing unit 213 may cause the working position P1 to transport the workpiece 90 from the working position P1 onto the loading table 11 without causing the machine 3B to execute an operation of gripping the workpiece 90 of the machine 3B by the tool 60B and without waiting for detection of gripping of the workpiece 90 by the grip sensor 62.

When the virtual controller 500 controls the virtual machine V2 instead of the controller 100, the processing unit 213 executes virtual processing in which a portion related to the operation of the machine 2 is different from real processing based on a real program and a virtual modification program. For example, the processing unit 213 generates supplementary data in accordance with the Real Processing Instruction 3-1 modified based on the Skip Processing Instruction 3-3 and the Supplementary Processing Instruction 3-2 without causing the machine 3B to execute an operation of gripping the workpiece 90 of the working position P1 by the tool 60B, and causes the machine 3B to execute an operation of transporting the workpiece 90 from the working position P1 onto the loading table 11 based on the supplementary data.

In accordance with the Real Processing Instruction 3-1 modified based on the Skip Processing Instruction 3-3 and the Skip Processing Instruction 3-4, the processing unit 213 may cause the working position P1 to transport the workpiece 90 from the working position P1 onto the loading table 11 without causing the machine 3B to execute an operation of gripping the workpiece 90 of the machine 3B by the tool 60B and without waiting for detection of gripping of the workpiece 90 by the grip sensor 62.

For example, the process generation unit 223 may generate the Supplementary Processing Instruction 3-1 and the Supplementary Processing Instruction 3-2 based on the fact that the detection information is not included in the virtual information in a case where the virtual controller 600A controls the virtual machine V3A and in a case where the virtual controller 500 controls the virtual machine V2, and store the generated virtual information in the program storage unit 112.

Control target determination unit 231 unit of the controller 200B determines whether control target of own controller is the machine 3B or the virtual machine V3B. For example, the control target determination unit 231 may determine whether a control target of the own controller is the machine 3B or the virtual machine V3B based on whether the own controller is a virtual controller configured as the simulation device 400.

As will be described later, the controller 200B itself may be configured to execute a real mode for actually controlling the machine 3B and a virtual mode for controlling the virtual machine V3B. The control target determination unit 231 may determine whether the control target of the own controller is the machine 3B or the virtual machine V3B based on which of the real mode and the virtual mode is selected.

The processing unit 213 executes real control processing when the control target of the own controller is the machine, and executes virtual control processing at least partially different from the real control processing when the control target of the own controller is a virtual machine. For example, when another controller controls a virtual machine and an own controller controls a subordinate machine, an externally dependent part related to an operation of the machine (the machine controlled by another controller) executes virtual processing different from real processing in the processing unit 213. This virtual processing is included in the above-described real control processing. When the other controller controls the machine and the own controller controls the subordinate virtual machine, the processing unit 213 may execute virtual processing in which the subordinate part related to the operation of the subordinate machine is different from the real processing. This virtual processing is included in the above-described virtual control processing.

As an example, when the own controller controls the subordinate virtual machine, the processing unit 213 causes the machine 3B to execute an operation of gripping the workpiece 90 of the working position P1 by the tool 60B according to the Real Processing Instruction 3-1 modified based on the Supplementary Processing Instruction 3-3, generates supplementary data, and causes the machine 3B to execute an operation of transporting the workpiece 90 from the working position P1 onto the loading table 11 based on the supplementary data.

The processing unit 213 may cause the machine 3B to execute an operation of gripping the workpiece 90 of the working position P1 by the tool 60B according to the Real Processing Instruction 3-1 modified based on the Skip Processing Instruction 3-5, and then cause the machine 3B to execute an operation of transporting the workpiece 90 from the working position P1 onto the loading table 11 without waiting for detection of gripping of the workpiece 90 by the grip sensor 62.

The transmission unit 232 transmits information to which the determination result by the control target determination unit 231 is added to another controller. For example, the transmission unit 232 transmits, to the controller 100 or the virtual controller 500, information obtained by adding a determination result (for example, the flag) by the control target determination unit 231 to information (control information) indicating the operation result of the machine 3B.

Virtual Controller

Figure 11:
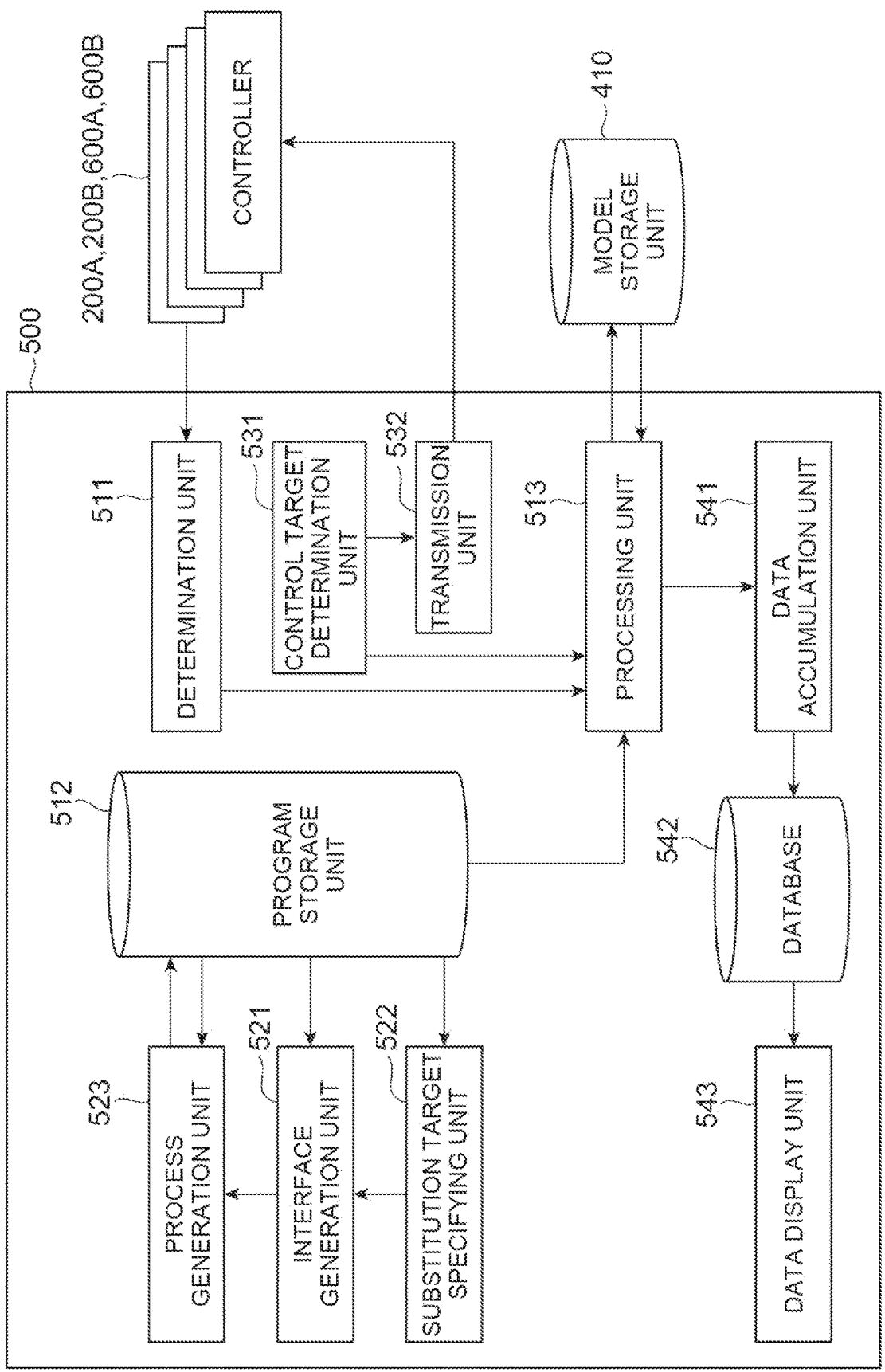
FIG. 11 is a block diagram illustrating an example functional configuration of a virtual controller.

As illustrated in FIG. 11, the virtual controller 500 includes, as functional blocks, a determination unit 511, a program storage unit 512, and a processing unit 513 corresponding to the determination unit 111, the program storage unit 112, and the processing unit 113, respectively, of the controller 100. Similarly to the determination unit 111, the determination unit 511 determines whether the other controller controls the machine or the virtual machine corresponding to the machine. The program storage unit 512 stores the same program as the real program and the virtual modification program stored in the program storage unit 112. The processing unit 513 simulates real processing by the processing unit 113 when the other controller controls the machine, and simulates virtual processing by the processing unit 113 when the other controller controls the virtual machine.

The processing executed by the processing unit 513 is different from the processing executed by the processing unit 113 mainly in that the virtual machine V2 is operated in the virtual space VS based on the three-dimensional model stored in the model storage unit 410 instead of operating the machine 2 in the real space RS. In other respects, the processing executed by the processing unit 513 is substantially similar to the processing executed by the processing unit 113.

The virtual controller 500 may further include an interface generation unit 521, a substitution target specifying unit 522, and a process generation unit 523 corresponding to the interface generation unit 121, the substitution target specifying unit 122, and the process generation unit 123, respectively, of the controller 100. The interface generation unit 521 generates a user interface similar to the user interface generated by the interface generation unit 121. For example, the interface generation unit 521 causes the controller 300 to display the user interface. Examples of the user interface will be described later in the description of the controller 300.

Similarly to the substitution target specifying unit 122, the substitution target specifying unit 522 specifies one or more non-executable parts based on a difference between the real information and the virtual information. The interface generation unit 521 causes the display part to display one or more non-executable parts specified by the substitution target specifying unit 522.

Similarly to the process generation unit 123, the process generation unit 523 generates virtual processing based on an input to the input part of the user interface. For example, the process generation unit 523 generates the above-described supplementary processing instruction or the skip processing instruction based on the input to the input part, and causes the program storage unit 512 to store the supplementary processing instruction or the skip processing instruction.

The virtual controller 500 may further include a control target determination unit 531 and a transmission unit 532 corresponding to the control target determination unit 131 and the transmission unit 132, respectively, of the controller 100. Similarly to the control target determination unit 131, the control target determination unit 531 determines whether the control target of the own controller is the machine (a subordinate machine) or the virtual machine (a subordinate virtual machine).

The processing unit 513 executes real control processing when the control target of the own controller is the machine, and executes virtual control processing at least partially different from the real control processing when the control target of the own controller is the virtual machine. For example, when the other controller controls the virtual machine and the own controller controls the subordinate machine, the processing unit 513 executes virtual processing in which an externally dependent part related to an operation of the machine (the machine controlled by another controller) is different from real processing. This virtual processing is included in the above-described real control processing. When the other controller controls the machine and the own controller controls the subordinate virtual machine, the processing unit 513 may execute virtual processing in which the subordinate part related to the operation of the subordinate machine is different from real processing. This virtual processing is included in the above-described virtual control processing.

Similarly to the transmission unit 132, the transmission unit 532 transmits, to the other controller, information to which the determination result by the control target determination unit 531 is added. For example, the transmission unit 532 transmits, to the controller 200A or the virtual controller 600A, information obtained by adding the determination result (for example, the flag) by the control target determination unit 531 to a command (control information) for operating the machine 3A. the transmission unit 532 transmits, to the controller 200B or the virtual controller 600B, information obtained by adding the determination result by the control target determination unit 531 to a command (control information) for operating the machine 3B.

The virtual controller 500 may further include a data accumulation unit 541, a database 542, and a data display unit 543 corresponding to the data accumulation unit 141, the database 142, and the data display unit 143, respectively, of the controller 100. Similarly to the data accumulation unit 141, the data accumulation unit 541 accumulates control data of the machine 2, machines 3A, 3B, V3A, and V3B in the database 542 in time series. The data display unit 543 displays the control data accumulated in the database 542 on the controller 300 or the like.

Figure 12:
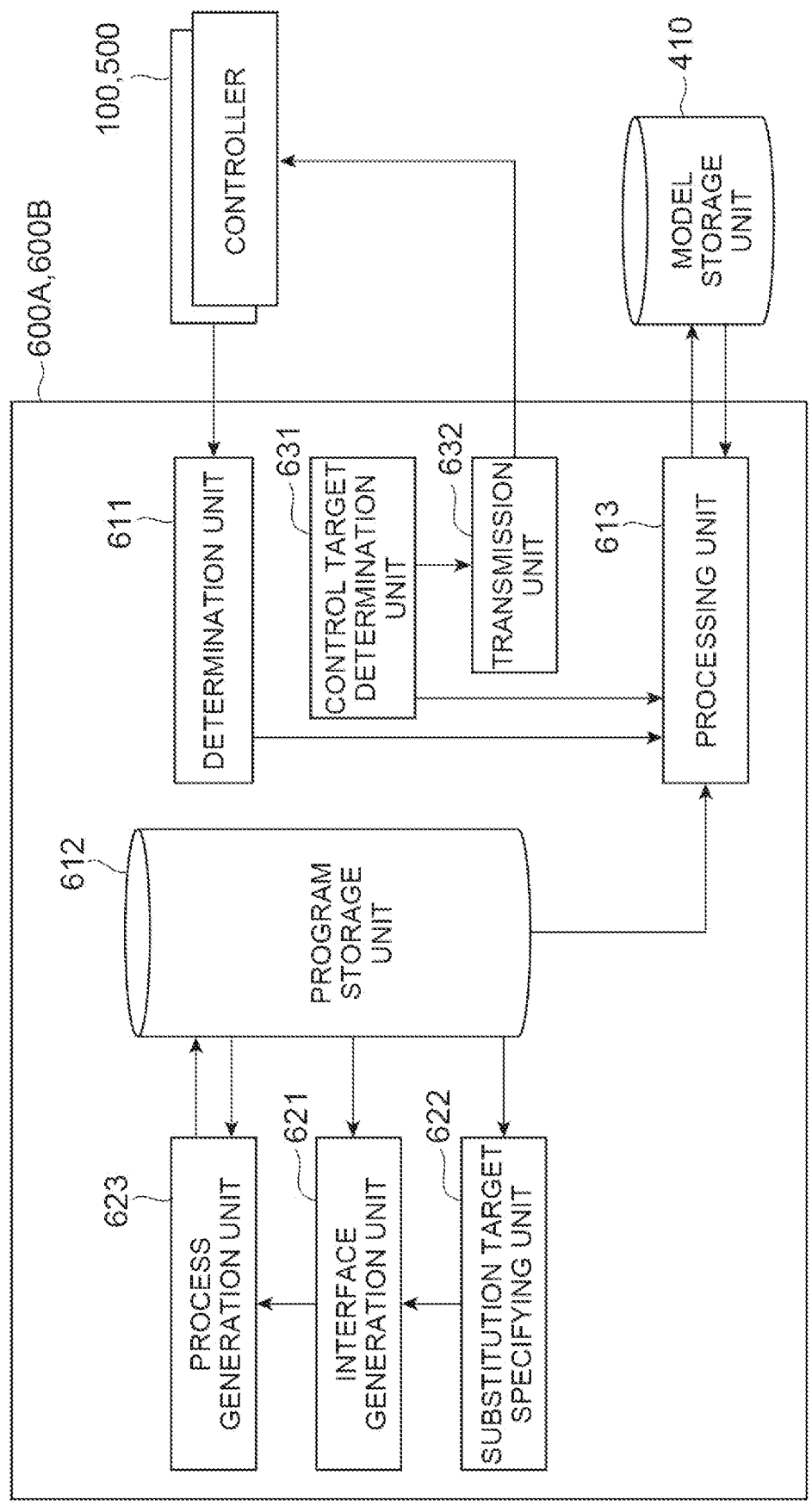
FIG. 12 is a block diagram illustrating another example functional configuration of a virtual controller.

As illustrated in FIG. 12, the virtual controller 600A includes, as functional blocks, a determination unit 611, a program storage unit 612, and a processing unit 613 corresponding to the determination unit 211, the program storage unit 212, and the processing unit 213, respectively, of the controller 200A. Similarly to the determination unit 211, the determination unit 611 determines whether the other controller controls the machine or the virtual machine corresponding to the machine. The program storage unit 612 stores the same program as the real program and the virtual modification program stored in the program storage unit 212. The processing unit 613 simulates real processing by the processing unit 213 when another controller controls the machine, and simulates virtual processing by the processing unit 213 when another controller controls the virtual machine.

The processing executed by the processing unit 613 is different from the processing executed by the processing unit 213 mainly in that the virtual machine V3A is operated in the virtual space VS based on the three-dimensional model stored in the model storage unit 410 instead of operating the machine 3A in the real space RS. In other respects, the processing executed by the processing unit 613 is substantially similar to the processing executed by the processing unit 213.

The virtual controller 600A may further include an interface generation unit 621, a substitution target specifying unit 622, and a process generation unit 623 corresponding to the interface generation unit 221, the substitution target specifying unit 222, and the process generation unit 223, respectively, of the controller 200A. The interface generation unit 621 generates a user interface similar to the user interface generated by the interface generation unit 221. For example, the interface generation unit 621 causes the controller 300 to display the user interface. Examples of the user interface will be described later in the description of the controller 300.

Similarly to the substitution target specifying unit 222, the substitution target specifying unit 622 specifies one or more non-executable parts based on a difference between the real information and the virtual information. The interface generation unit 621 causes the display part to display the one or more non-executable parts specified by the substitution target specifying unit 622.

Similarly to the process generation unit 223, the process generation unit 623 generates virtual processing based on an input to the input part of the user interface. For example, the process generation unit 623 generates the above-described supplementary processing instruction or the skip processing instruction based on the input to the input part, and causes the program storage unit 612 to store the supplementary processing instruction or the skip processing instruction.

The virtual controller 600A may further include a control target determination unit 631 and a transmission unit 632 corresponding to the control target determination unit 231 and the transmission unit 232, respectively, of the controller 200A. Similarly to the control target determination unit 231, the control target determination unit 631 determines whether the control target of the own controller is the machine (the subordinate machine) or the virtual machine (the subordinate virtual machine).

The processing unit 613 executes real control processing when the control target of the own controller is the machine, and executes virtual control processing at least partially different from the real control processing when the control target of the own controller is the virtual machine. For example, when the other controller controls the virtual machine and the own controller controls the subordinate machine, the processing unit 613 executes virtual processing in which an externally dependent part related to an operation of the machine (a machine controlled by another controller) is different from real processing. This virtual processing is included in the above-described real control processing. When the other controller controls the machine and the own controller controls the subordinate virtual machine, the processing unit 613 may execute virtual processing in which the subordinate part related to the operation of the subordinate machine is different from real processing. This virtual processing is included in the above-described virtual control processing.

Similarly to the transmission unit 232, the transmission unit 632 transmits, to the other controller, information to which the determination result by the control target determination unit 631 is added. For example, the transmission unit 632 transmits, to the controller 100 or the virtual controller 500, information obtained by adding the determination result (for example, the flag) by the control target determination unit 631 to information (control information) indicating the operation result of the virtual machine V3A.

Similarly to the virtual controller 600A, the virtual controller 600B includes the determination unit 611, the program storage unit 612, and the processing unit 613 corresponding to the determination unit 211, the program storage unit 212, and the processing unit 213, respectively, of the controller 200B. The processing executed by the processing unit 613 is different from the processing executed by the processing unit 213 mainly in that the virtual machine V3B is operated in the virtual space VS based on the three-dimensional model stored in the model storage unit 410 instead of operating the machine 3B in the real space RS. In other respects, the processing executed by the processing unit 613 is substantially similar to the processing executed by the processing unit 213.

Similarly to the virtual controller 600A, the virtual controller 600B may further include the interface generation unit 621, the substitution target specifying unit 622, and the process generation unit 623 corresponding to the interface generation unit 221, the substitution target specifying unit 222, and the process generation unit 223, respectively, of the controller 200B. Similarly to the virtual controller 600A, the virtual controller 600B may further include the control target determination unit 631 and the transmission unit 632 corresponding to the control target determination unit 231 and the transmission unit 232, respectively, of the controller 200B. The transmission unit 632 transmits information obtained by adding a determination result (for example, the flag) by the control target determination unit 631 to information (control information) indicating an operation result of the virtual machine V3B to the controller 100 or the virtual controller 500.

Setting Controller

The controller 300 is a setting controller that sets a control condition for the controllers 100, 200A, and 200B and the virtual controllers 500, 600A, and 600B. Examples of the control condition include the above-described predetermined value for the torque detected by the torque sensor 61 in the screw fastening by the grip sensor 62 in addition to the control gain. The controller 300 is a controller that can communicate with each of the controllers 100, 200A, and 200B and the virtual controllers 500, 600A, and 600B (other controllers).

Figure 13:
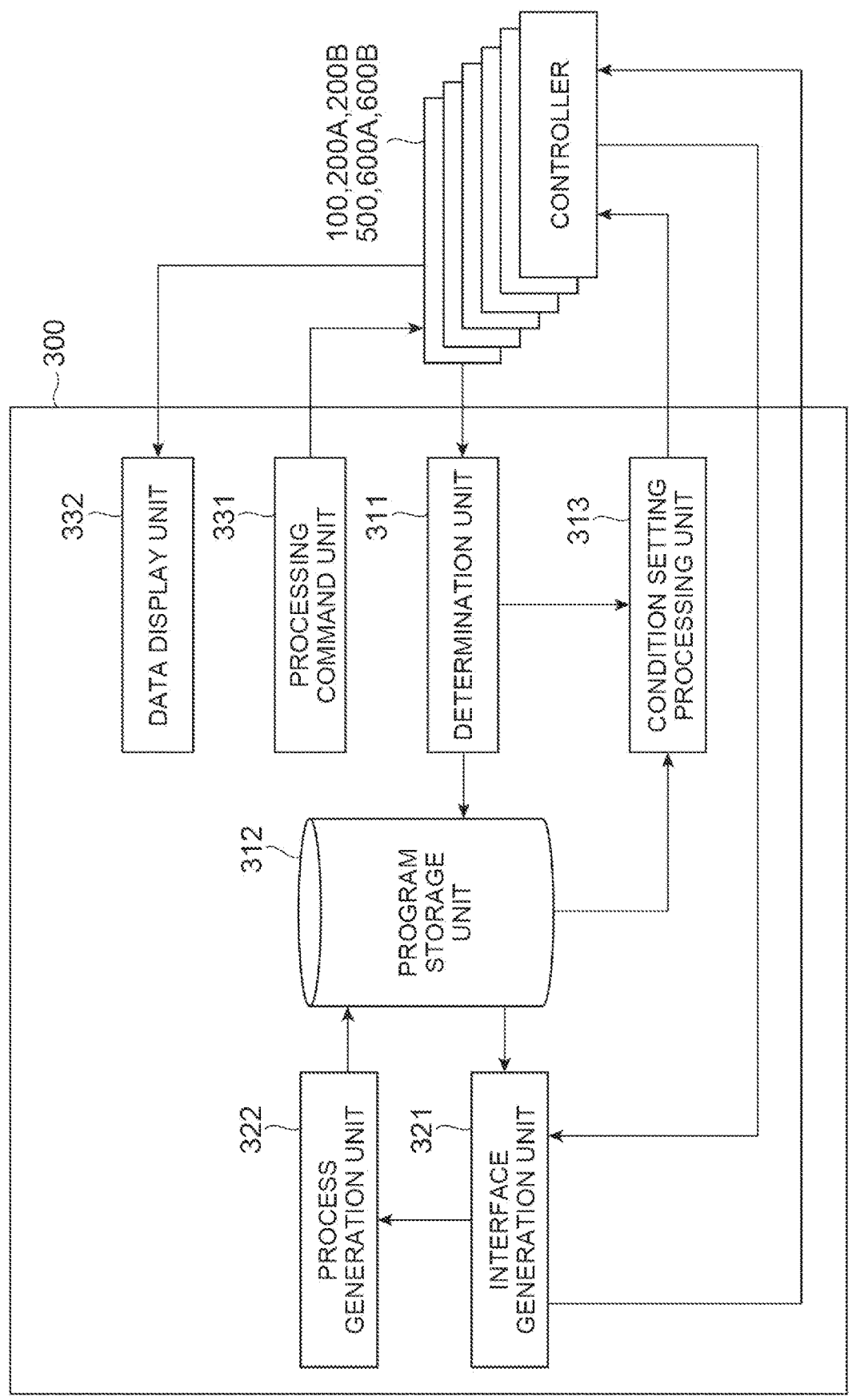
FIG. 13 is a block diagram illustrating an example functional configuration of the setting controller.

As illustrated in FIG. 13, the controller 300 includes a determination unit 311, a program storage unit 312, and a condition setting processing unit 313 as functional blocks. The determination unit 311 determines whether the other controller controls the machine or controls the virtual machine corresponding to the machine. The determination unit 311 may determine whether the other controller controls the machine or the virtual machine based on information received from the other controller. The information received from the other controller may include control information in the other controller and a flag indicating whether the other controller controls the machine or the virtual machine, and the determination unit 311 may determine whether the other controller controls the machine or the virtual machine based on the flag.

The configuration of the control information may vary depending on whether the other controller controls the machine or the virtual machine. The determination unit 311 may determine whether the other controller controls the machine or the virtual machine based on the control information.

It is conceivable that, when the other controller controls the machine, the control information is encrypted, and when the other controller controls the virtual machine, the control information is not encrypted. The determination unit 311 may determine whether the other controller controls the machine or the virtual machine based on whether or not the control information is encrypted.

A communication condition for receiving information from the other controller may be different depending on whether the other controller controls the machine or the virtual machine. Examples of differences in communication conditions include differences in communication delay times, differences in ports used for communication, and the like. When a communication condition for receiving information from the other controller is different depending on whether the other controller controls the machine or the virtual machine, the determination unit 311 may determine whether the other controller controls the machine or the virtual machine based on the communication condition for receiving information from the other controller.

The program storage unit 312 stores a predetermined real program. The real program is a program that causes the machine to execute predetermined real processing when the other controller controls the controller 300. The program storage unit 312 further stores a virtual modification program that causes the controller 300 to execute virtual processing obtained by modifying at least a part of real processing when the other controller controls the virtual machine.

The real program stored in the program storage unit 312 includes the following real setting processing instructions.

Real Setting Processing Instruction 1) Generating a user interface for setting a control condition for the controller 100 (hereinafter referred to as a "real interface"), and setting the control condition for the controller 100 based on an input to the real interface Real Setting Processing Instruction 2) Generating a real interface for the controller 200A, and setting the control condition for the controller 200A based on an input to the real interface Real Setting Processing Instruction 3) Generating a real interface for the controller 200B, and setting the control condition for the controller 200B based on an input to the real interface The virtual processing may include generating a virtual interface with different configurable items as compared to configurable items of the real interface generated by the real setting processing instruction.

For example, the virtual modification program may include the following item change instructions.

Item Change Instruction 1) Invalidating a part of a setting item in a real interface for the controller 100 when the virtual controller 500, in place of the controller 100, is a setting target of the control condition Item Change Instruction 2) Invalidating a part of a setting item in a real interface for the controller 200A when the virtual controller 600A, in place of the controller 200A, is a setting target of the control condition Item Change Instruction 3) Invalidating a part of a setting item in a real interface for the controller 200B when the virtual controller 600B, in place of the controller 200B, is a setting target of the control condition The condition setting processing unit 313 executes predetermined real processing when the other controller controls the machine, and executes virtual processing at least partially different from the real processing when the other controller controls the virtual machine. As an example, the condition setting processing unit 313 sets the control condition for the controller 100 based on the Real Setting Processing Instruction 1 when the other controller to which the control condition is set is the controller 100 that controls the machine 2. When the other controller is the virtual controller 500 that controls the virtual machine V2, the condition setting processing unit 313 generates a virtual interface in which a part of a setting item in a real interface for the controller 100 is invalidated according to the Real Setting Processing Instruction 1 corrected based on the Item Change Instruction 1, and sets a control condition for the virtual controller 500 based on an input to the virtual interface.

The condition setting processing unit 313 sets the control condition for the controller 200A based on the Real Setting Processing Instruction 2 when the other controller to which the control condition is set is the controller 200A that controls the machine 3A. When the other controller is the virtual controller 600A that controls the virtual machine V3A, the condition setting processing unit 313 generates a virtual interface in which a part of setting items in a real interface for the controller 200A is invalidated according to the Real Setting Processing Instruction 2 corrected based on the Item Change Instruction 2, and sets a control condition for the virtual controller 600A based on an input to the virtual interface.

The condition setting processing unit 313 sets the control condition for the controller 200B based on the Real Setting Processing Instruction 3 when the other controller to which the control condition is set is the controller 200B that controls the machine 3B. When the other controller is the virtual controller 600B that controls the virtual machine V3B, the condition setting processing unit 313 generates a virtual interface in which a part of setting items in a real interface for the controller 200B is invalidated according to the Real Setting Processing Instruction 3 corrected based on the Item Change Instruction 3, and sets a control condition for the virtual controller 600B based on an input to the virtual interface.

The controller 300 may be configured to generate virtual processing based on input to the user interface. For example, the controller 300 further includes an interface generation unit 321 and a process generation unit 322.

The interface generation unit 321 generates a user interface through which an item to be invalidated in the virtual interface among setting items in the real interface can be input for each controller. Hereinafter, this user interface is referred to as an "item setting interface". The process generation unit 322 generates the Item Change Instruction 1, the Item Change Instruction 2, and the Item Change Instruction 3 based on the input to the item setting interface, and stores them in the program storage unit 312.

The interface generation unit 321 may further generate a user interface for selectively displaying the user interface generated by each of the controllers 100, 200A, and 200B and the virtual controllers 500, 600A, and 600B. Hereinafter, this user interface is referred to as a "processing generation interface" and is distinguished from the real interface, the virtual interface, and the item setting interface described above.

Figure 14:
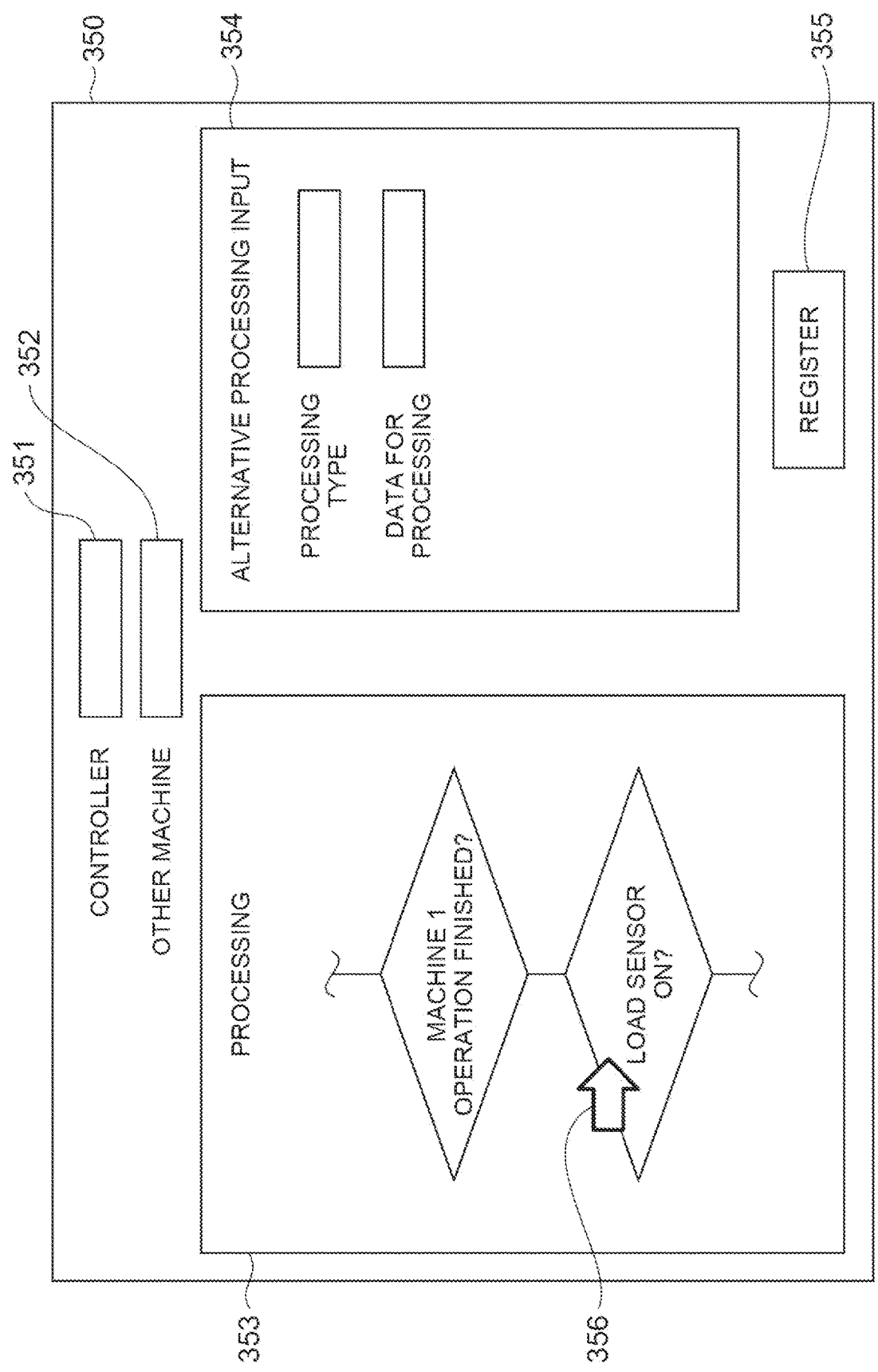
FIG. 14 is a schematic diagram illustrating an example processing generation interface.

FIG. 14 is a schematic diagram illustrating an example processing generation interface generated by the interface generation unit 321. As illustrated in FIG. 14, a processing generation interface 350 includes a controller selection part 351, a machine selection part 352, a display part 353, an input part 354, and a registration instruction unit 355.

The controller selection part 351 is an input interface for selecting one of the controllers 100, 200A, and 200B and the virtual controllers 500, 600A, and 600B.

The machine selection part 352 is an input interface for selecting the machine controlled by the other controller based on the controller selected by the controller selection part 351. For example, when the controller 100 is selected in the controller selection part 351, either the machine 3A or the machine 3B corresponds to the machine controlled by the other controller. When the controller 200A is selected in the controller selection part 351, either the machine 2 or the machine 3B is the machine controlled by the other controller. When the controller 200B is selected in the controller selection part 351, either the machine 2 or the machine 3A is the machine controlled by the other controller.

The display part 353 displays a non-executable part 356 in a case where the virtual machine corresponding to the machine selected in the machine selection part 352 is controlled in the process executed by the controller selected in the controller selection part 351. The input part 354 is a part for inputting alternative processing to each of the non-executable part 356. For example, the input part 354 includes an input interface for inputting alternative processing corresponding to the non-executable part 356 selected in the display part 353. The display contents in the display part 353 and the input part 354 are generated by an interface generation unit (any of the interface generation units 121, 221, 521, and 621) of the controller selected in the controller selection part 351.

The registration instruction unit 355 is an input interface for requesting generation and registration of virtual processing based on alternative processing input in the input part 354. When generation and registration of virtual processing are requested by the registration instruction unit 355, virtual processing is generated and registered based on the input content of the input part 354 by the process generation unit (any one of the process generation units 123, 223, 523, and 623) of the controller selected in the controller selection part 351.

The controller 300 may further include a processing command unit 331 and a data display unit 332. The processing command unit 331 instructs the controller 100 or the virtual controller 500 to execute predetermined processing. The data display unit 332 displays the control data accumulated in the controller 100 or the virtual controller 500 by executing the processing.

In the above description, the case where the virtual controller that controls the virtual machine is provided in the simulation device 400 separately from the controllers 100, 200A, and 200B that control the machine has been illustrated, but the configuration is not limited thereto. The controllers 100, 200A, and 200B themselves may have the function of controlling the virtual machine (simulating the control of the machine).

The controllers 200A and 200B may execute real control processing including processing for causing the power circuit 280 to output driving power when the control target of the own controller is the machine, and may execute virtual control processing not including processing for causing the power circuit 280 to output driving power when the control target of the own controller is the virtual machine.

Hardware Configuration

Figure 15:
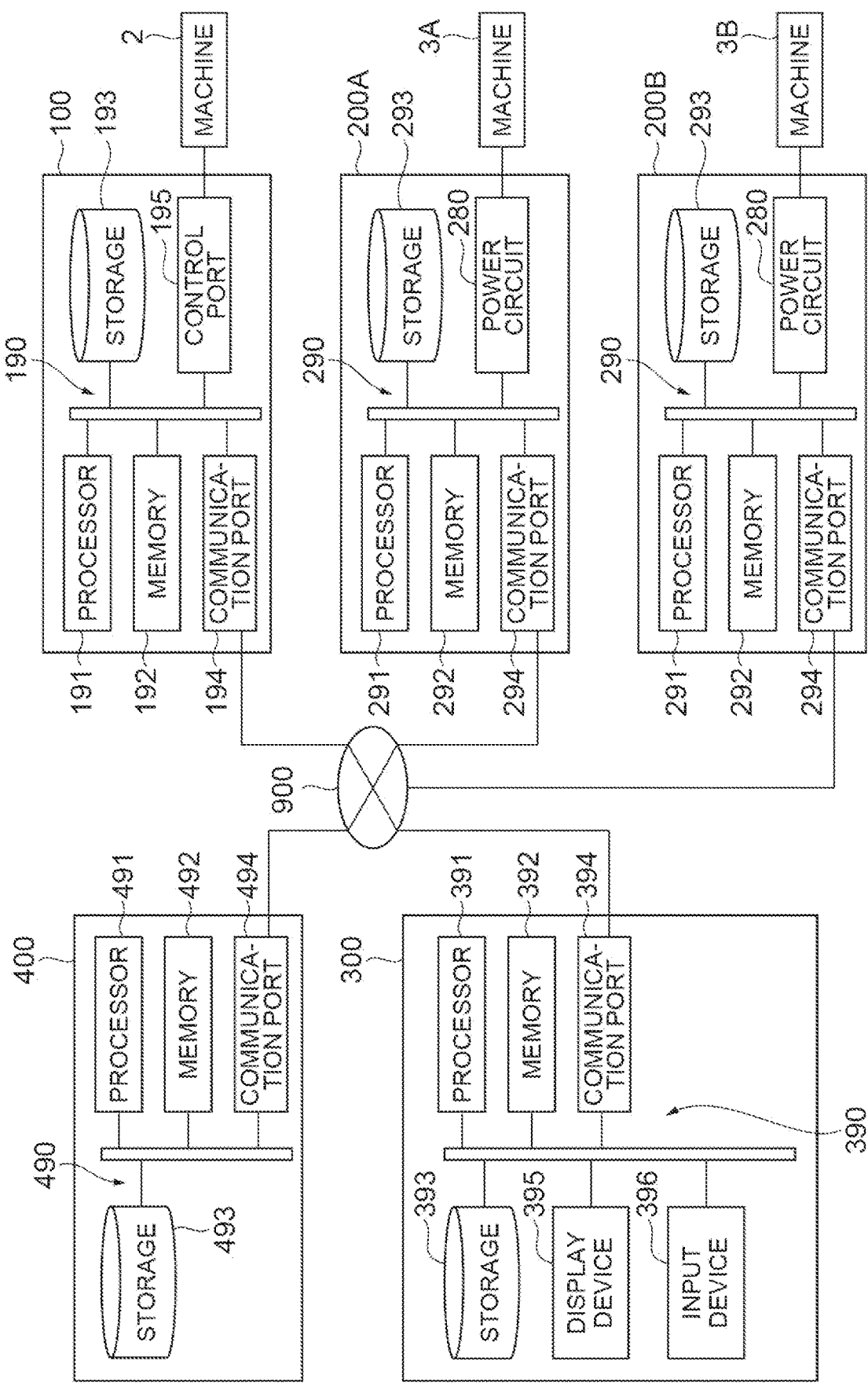
FIG. 15 is a block diagram illustrating an example hardware configuration of controllers.

FIG. 15 is a block diagram illustrating an example hardware configuration of the controller 100, the controller 200A, the controller 200B, the simulation device 400, and the controller 300. The controller 100 includes control circuitry 190. The control circuitry 190 includes one or more processor(s) 191, a memory 192, storage 193, a communication port 194, a control port 195, and a machine system 196. The storage 193 is a non-volatile storage medium and stores a program for causing the control circuitry 190 to execute: determining whether the other controller controls the machine or a virtual machine corresponding to the machine; executing predetermined real processing when the other controller controls the machine; and executing virtual processing at least partially different from the real processing when the other controller controls the virtual machine. For example, the storage 193 stores a program for configuring the functional block of the controller 100 described above into the control circuitry 190. Examples of the storage 193 include a flash memory and a hard disk.

The memory 192 temporarily stores a program or the like loaded from the storage 193. Examples of the memory 192 include a random-access memory. The processor(s) 191 repeatedly executes a program loaded in the memory 192 and temporarily stores an operation result generated by executing the program in the memory 192, thereby configuring the functional blocks in the control circuitry 190.

The communication port 194 communicates with other controllers via the communication network 900 based on commands from the processor(s) 191. The control port 195 controls the machine 2 based on commands from the processor(s) 191.

As described above, each of the controller 200A and the controller 200B includes the power circuit 280 and the control circuitry 290. The control circuitry 290 includes one or more processor(s) 291, a memory 292, storage 293, and a communication port 294. The storage 293 is a non-volatile storage medium and stores a program for causing the control circuitry 290 to execute: determining whether the other controller controls the machine or a virtual machine corresponding to the machine;

executing predetermined real processing when the other controller controls the machine; and executing virtual processing at least partially different from the real processing when the other controller controls the virtual machine. For example, the storage 293 stores a program for configuring the functional blocks of the controller 200A or the controller 200B described above into the control circuitry 290. Examples of the storage 293 include a flash memory and a hard disk.

The memory 292 temporarily stores a program or the like loaded from the storage 293. Examples of the memory 292 include a random-access memory. The processor(s) 291 repeatedly executes a program loaded in the memory 292 and temporarily stores an operation result generated by executing the program in the memory 292, thereby configuring the functional blocks in the control circuitry 290.

The communication port 294 communicates with other controllers via the communication network 900 based on commands from the processor(s) 291. The power circuit 280 generates driving power of the machine 3A or the machine 3B based on commands from the processor(s) 291.

The simulation device 400 includes simulation circuitry 490. The simulation circuitry 490 includes one or more processor(s) 491, a memory 492, storage 493, and a communication port 494. The storage 493 is a non-volatile storage medium and stores a program for causing the simulation circuitry 490 to execute: determining whether the other controller controls the machine or a virtual machine corresponding to the machine; executing predetermined real processing when the other controller controls the machine; and executing virtual processing at least partially different from the real processing when the other controller controls the virtual machine. For example, the storage 493 stores a program for configuring the functional blocks of the simulation device 400 described above into the simulation circuitry 490. Examples of the storage 493 include a flash memory and a hard disk.

The memory 492 temporarily stores a program or the like loaded from the storage 493. Examples of the memory 492 include a random-access memory. The processor(s) 491 repeatedly executes a program loaded in the memory 492 and temporarily stores an operation result generated by executing the program in the memory 492, thereby configuring the functional blocks in the simulation circuitry 490. The communication port 494 communicates with other controllers via the communication network 900 based on commands from the processor(s) 291.

The controller 300 includes setting circuitry 390. The setting circuitry 390 includes one or more processor(s) 391, a memory 392, storage 393, a communication port 394, a display device 395, and an input device 396. The storage 393 is a non-volatile storage medium and stores a program for causing the setting circuitry 390 to execute: determining whether the other controller controls the machine or a virtual machine corresponding to the machine; executing predetermined real processing when the other controller controls the machine; and executing virtual processing at least partially different from the real processing when the other controller controls the virtual machine. For example, the storage 393 stores a program for configuring the functional blocks of the controller 300 described above into the setting circuitry 390. Examples of the storage 393 include a flash memory and a hard disk.

The memory 392 temporarily stores a program or the like loaded from the storage 393. Examples of the memory 392 include a random-access memory. The processor(s) 391 repeatedly executes a program loaded in the memory 392 and temporarily stores an operation result generated by executing the program in the memory 392, thereby configuring the functional block in the setting circuitry 390.

The communication port 394 communicates with other controllers via the communication network 900 based on commands from the processor(s) 391. The display device 395 displays the above-described various user interfaces based on commands from the processor(s) 391. Examples of the display device 395 include a liquid crystal monitor. The input device 396 acquires inputs to various user interfaces. Examples of the input device 396 include a keyboard and a mouse. The input device 396 may be integrated with the display device 395 as a so-called touch panel.

System Construction Procedure Next, an example system construction procedure executed by the machine system 1 will be described as an example of the system construction method. Here, the system construction procedure means a procedure for constructing a system in which each of the plurality of controllers controls the machine by changing the control target of the plurality of controllers from the virtual machine to the machine in a stepwise manner.

The procedure includes: determining that another controller controls a virtual machine corresponding to a machine based on information received from the other controller; executing virtual processing and displaying an executed result; determining that a control target by the other controller is changed from the virtual machine to the machine based on information received from the other controller; changing the virtual processing to real processing at least partially different from the virtual processing in response to the machine target by the other controller being changed from the virtual machine to the machine; and executing the real processing and displaying an executed result.

Figure 16:
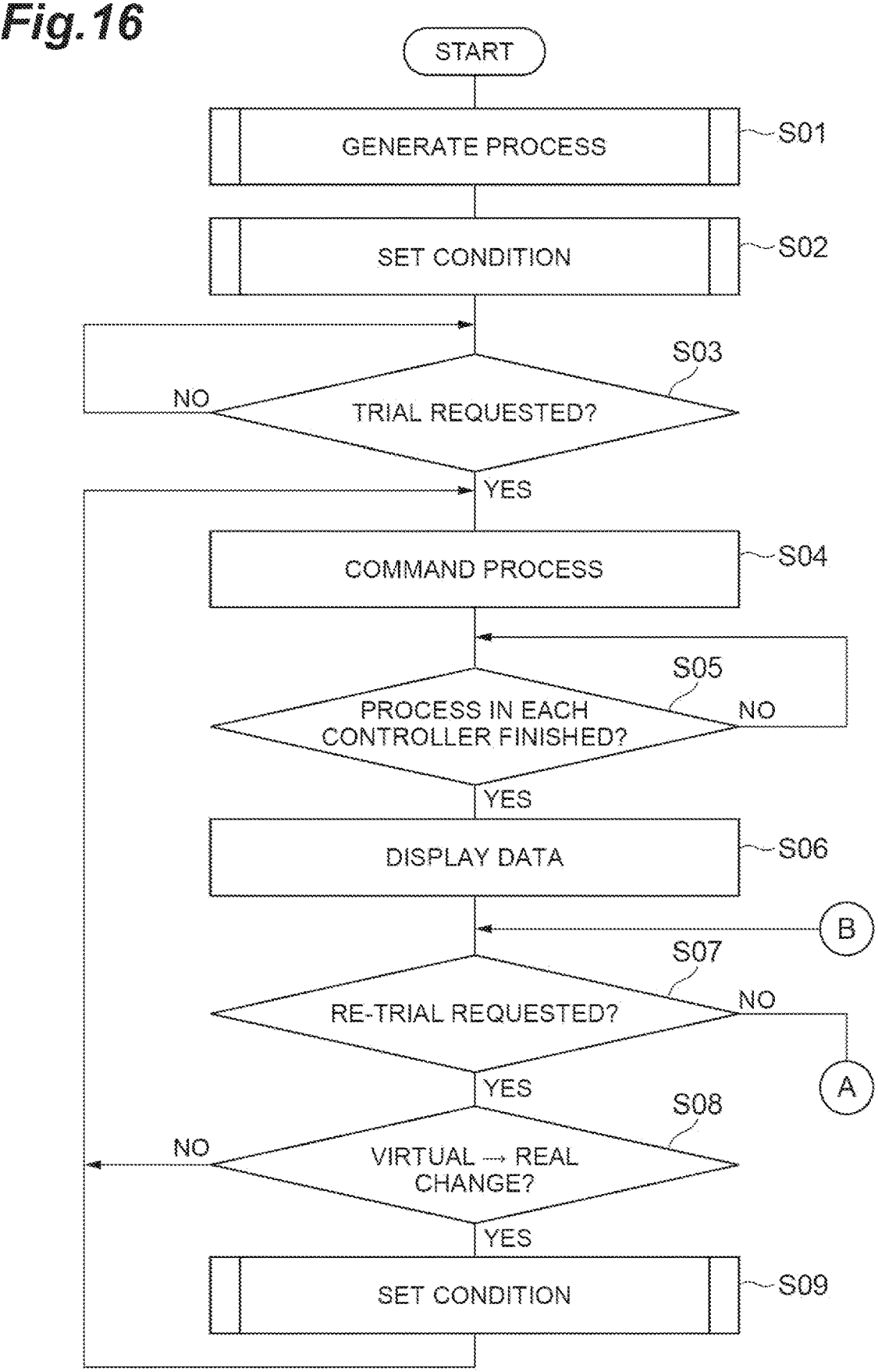
FIG. 16 is a flowchart illustrating an example system construction procedure.

The system construction procedure is integrally executed by, for example, the controller 300. As illustrated in FIG. 16, the controller 300 first executes operations S01 and S02. In the operation S01, the controller 300 generates virtual processing for each of other communicable controllers. Contents of the operation S01 will be described later.

In the operation S02, the controller 300 sets a control condition for each of the other communicable controllers. Contents of the operation S02 will be described later.

Next, the controller 300 executes operations S03, S04, S05, and S06. In the operation S03, the processing command unit 331 waits for a trial request for processing in the current system configuration to be input by the input device 396 or the like. In the operation S04, the processing command unit 331 instructs the controller 100 or the virtual controller 500 to execute processing.

Thereafter, in each of the controller 100 or the virtual controller 500, the controller 200A or the virtual controller 500A, and the controller 200B or the virtual controller 500B, it is determined whether the other controller controls the machine or the virtual machine, and when it is determined that the other controller controls the virtual machine, virtual processing corresponding thereto is executed. In the operation S05, the data display unit 332 waits for completion of processing in the controller 100 or the virtual controller 500. In the operation S06, the data display unit 332 executes processing to display control data (processing result) accumulated in the controller 100 or the virtual controller 500.

Next, the controller 300 executes a operation S07. In the operation S07, the processing command unit 331 confirms whether or not the trial request for processing is input again by the input device 396 or the like. If it is determined in the operation S07 that the trial request has been input again, the controller 300 executes a operation S08. In the operation S08, the processing command unit 331 confirms whether or not the control target by any of the other controllers is changed from the virtual machine to the machine. If it is determined in the operation S08 that the control target by any of the other controllers is changed from the virtual machine to the machine, the controller 300 executes an operation S09 similar to the operation S02.

Thereafter, the controller 300 returns the processing to the operation S04. When the operation S07 determines that the control target is not changed from the virtual machine to the machine, the controller 300 returns the processing to the operation S04 without executing the operation S09. As described above, the trial of the process and the display of the control data (execution result of the process) are repeatedly executed. When the other controller is changed from the virtual machine to the machine in the middle of this repetitive process, the virtual processing related to the machine is replaced with the real processing, and control data of real processing is displayed.

By repeating this procedure, a system in which each of the plurality of controllers controls the machine is constructed, and when control data is displayed, the system construction procedure is completed.

Figure 17:
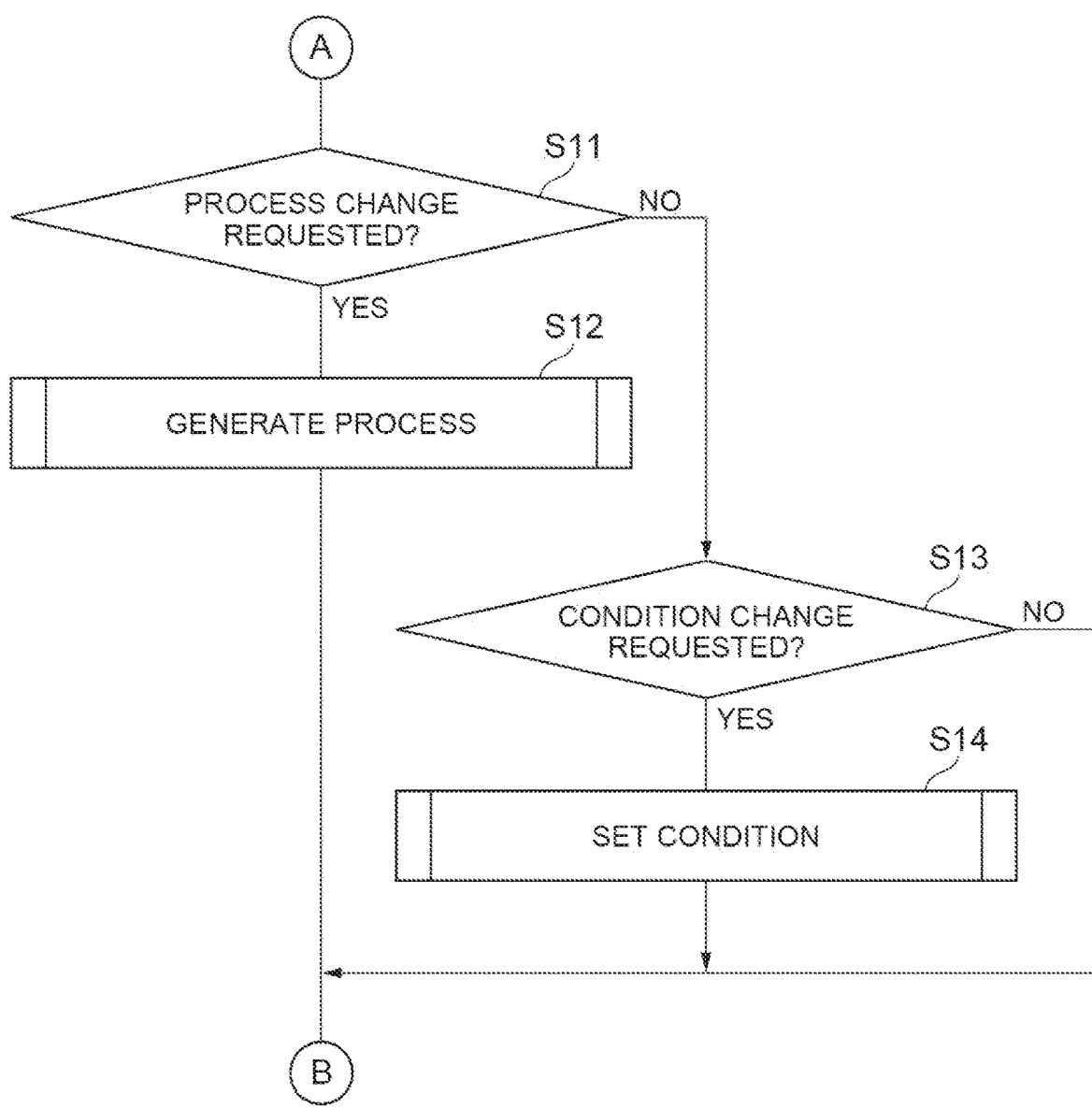
FIG. 17 is a flowchart illustrating another example system construction procedure.

When the operation S07 determines that the trial request has not been input again, the controller 300 executes an operation S11 as illustrated in FIG. 17. In the operation S11, the processing command unit 331 confirms whether or not a change request of virtual processing is input by the input device 396 or the like. If it is determined in the operation Si 1 that a request to change virtual processing is input, the controller 300 executes a operation S12 similar to the operation S01.

If it is determined in the operation S11 that a request to change virtual processing has not been input, the controller 300 executes an operation S13. In the operation S13, the processing command unit 331 confirms whether or not a change request of the control condition is input by the input device 396 or the like. When it is determined in the operation S13 that the change request of the control condition is input, the controller 300 executes an operation S14 similar to the operation S02.

After the operation S12 or S14, the controller 300 returns processing to the operation S07. If it is determined in the operation S13 that the change request of the control condition has not been input, the controller 300 returns the processing to the operation S07 without executing operations S12 and S14. Thereafter, until a trial request is input again, virtual processing and control condition are reset in response to the request.

Figure 18:
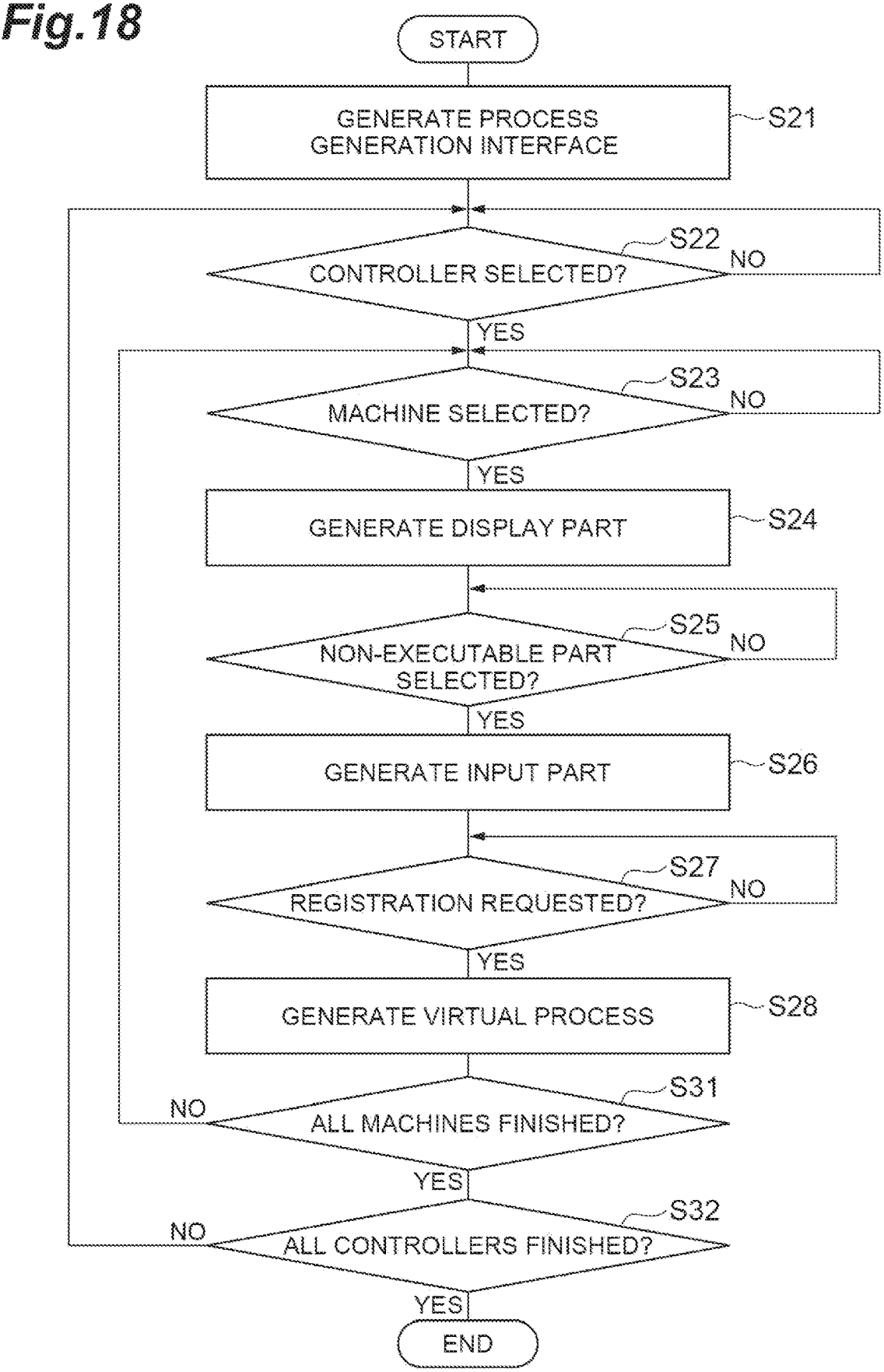
FIG. 18 is a flowchart illustrating an example procedure for generating virtual processing.

FIG. 18 is a flowchart illustrating a procedure for generating virtual processing in the operation S01. First, the controller 300 executes operations S21, S22, and S23. In the operation S21, the interface generation unit 321 generates the above-described processing generation interface 350 and displays it in the display device 395 or the like. In the operation S22, the interface generation unit 321 waits for the controller to be selected in the controller selection part 351. Hereinafter, the controller selected in the controller selection part 351 is referred to as a "selected controller". In the operation S23, the interface generation unit 321 waits for the machine to be selected in the machine selection part 352. Hereinafter, the machine to be selected in the machine selection part 352 is referred to as "the other machine", and the other machine selected in the machine selection part 352 is referred to as a "selected machine".

Next, the controller 300 executes an operation S24. In the operation S24, a substitution target specifying unit (any of the substitution target specifying unit 122, the substitution target specifying unit 222, the substitution target specifying unit 522, and the substitution target specifying unit 622) of the selected controller specifies one or more non-executable parts corresponding to the selected machine based on a difference between the real information and the virtual information. An interface generation unit (any one of the interface generation units 121, 221, 521, and 621) of the selected controller displays one or more non-executable parts 356 specified by the substitution target specifying unit in the display part 353.

Next, the controller 300 executes operations S25 and S26. In the operation S25, the interface generation unit of the selected controller waits for the non-executable part 356 to be selected in the display part 353. In the operation S26, the interface generation unit of the selected controller displays the input part 354 for inputting alternative processing to the selected the non-executable part 356.

Next, the controller 300 executes operations S27 and S28. In the operation S27, the process generation unit (any one of the process generation units 123, 223, 523, and 623) of the selected controller waits for input of a registration request by the registration instruction unit 355. In the operation S28, the process generation unit of the selected controller generates virtual processing based on the input to the registration instruction unit 355.

Next, the controller 300 executes an operation S31. In the operation S31, the interface generation unit 321 confirms whether or not generation of virtual processing is completed for all other the machine.

If it is determined in the operation S31 that there remains the machine for which virtual processing has not been generated, the controller 300 returns the processing to the operation S23. Thereafter, the operations S23 to S31 are repeated until the generation of virtual processing is completed for all of the other machines.

When it is determined in the operation S31 that the generation of virtual processing has been completed for all other machines, the controller 300 executes an operation S32. In the operation S32, it is checked whether the generation of virtual processing has been completed for all the controllers to be selected in the controller selection part 351. If it is determined in the operation S32 that there remains the machine for which virtual processing has not been generated, the controller 300 returns the processing to the operation S22. Thereafter, the operations S22 to S31 are repeated until the generation of virtual processing is completed for all the controllers. When it is determined in the operation S32 that the generation of virtual processing is completed for all the controllers, the controller 300 completes the generation procedure of virtual processing.

Figure 19:
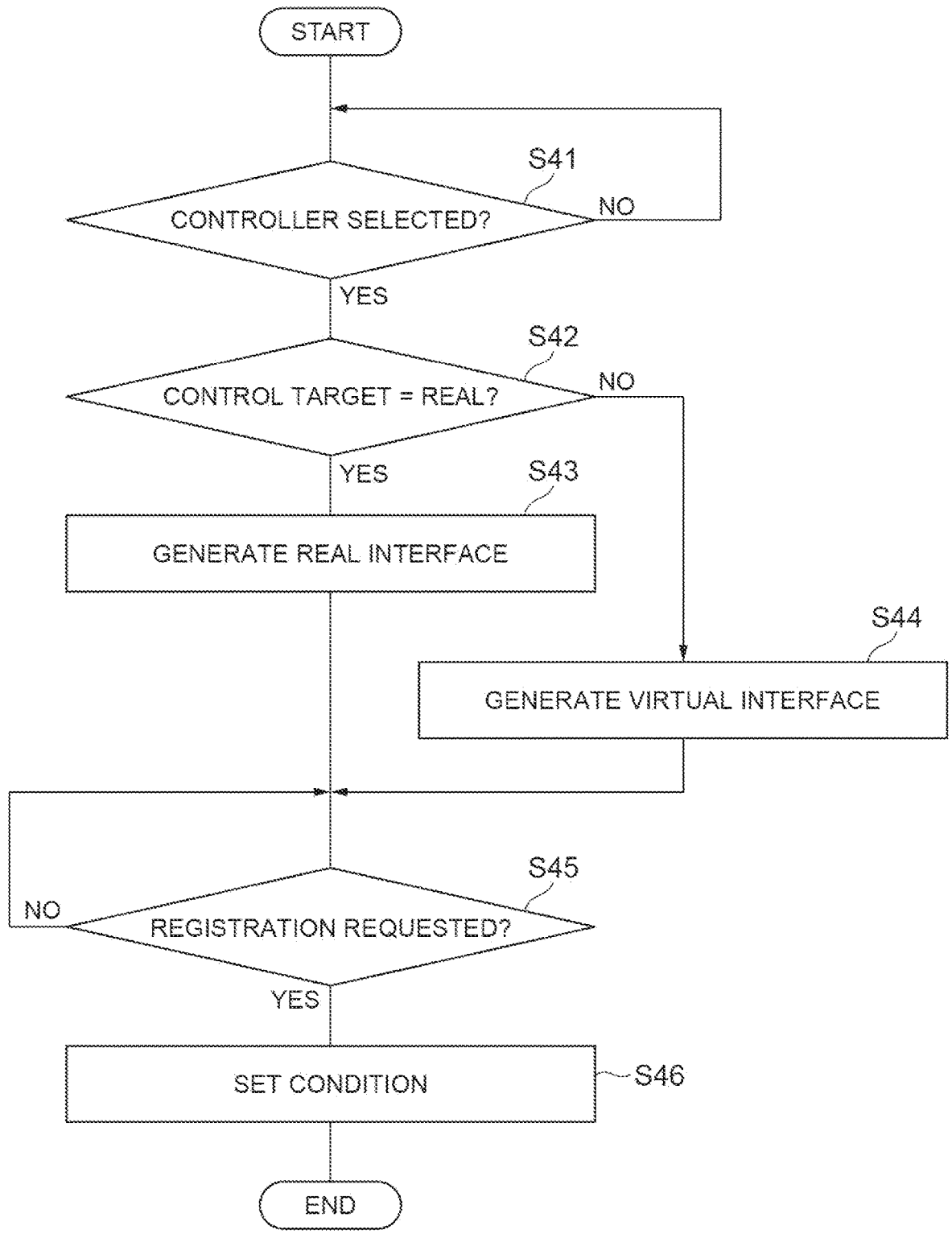
FIG. 19 is a flowchart illustrating an example setting procedure of control condition.

FIG. 19 is a flowchart illustrating the setting procedure of control conditions in the operation S02. First, the controller 300 executes operations S41 and S42. In the operation S41, the condition setting processing unit 313 waits for another controller to be set with a control condition to be selected by the input device 396 or the like. Hereinafter, the selected other controller is referred to as a "selected controller". In the operation S42, the condition setting processing unit 313 determines whether the control target of the selected controller is the machine or the virtual machine.

If it is determined in the operation S42 that the control target of the selected controller is the machine, the controller 300 executes a operation S43. If the operation S42 determines that the control target of the selected controller is a virtual machine, the controller 300 executes an operation S44. In the operation S43, the condition setting processing unit 313 generates the real interface and displays it on the display device 395 or the like. In the operation S44, the condition setting processing unit 313 generates the virtual interface and displays it on the display device 395 or the like.

After the operation S43 or the operation S44, the controller 300 executes operations S45 and S46. In the operation S45, the condition setting processing unit 313 waits for a registration request of the control condition to be input by the input device 396 or the like. In the operation S46, a control condition for the selected controller is set based on an input to the real interface or the virtual interface.

Figure 20:
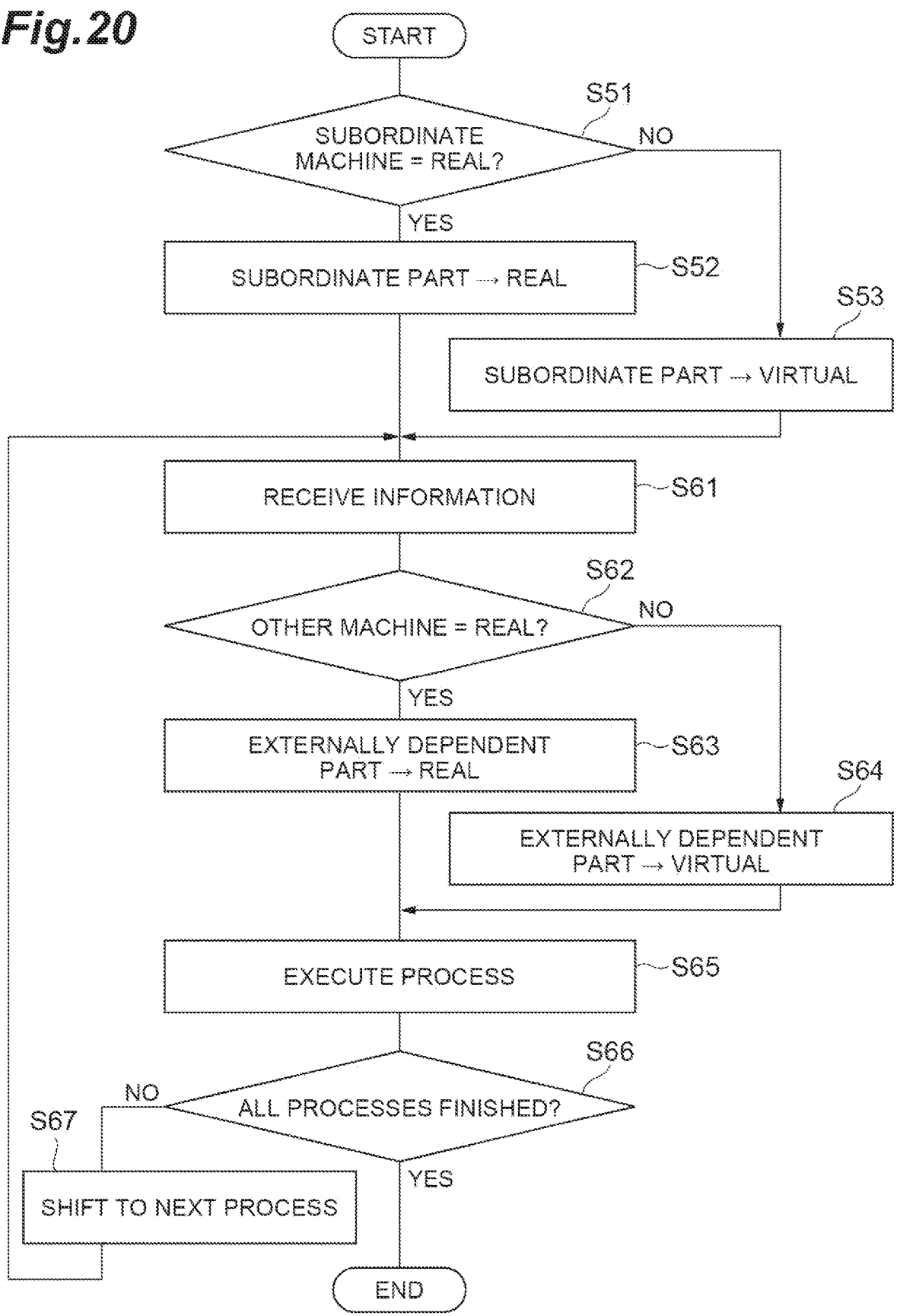
FIG. 20 is a flowchart illustrating an example processing procedure.

FIG. 20 is a flowchart illustrating an example processing procedure executed in each of the controller 100 or the virtual controller 500, the controller 200A or the virtual controller 500A, and the controller 200B or the virtual controller 500B in response to a request to execute processing in the operation S04. Hereinafter, the controller 100 or the virtual controller 500, the controller 200A or the virtual controller 500A, and the controller 200B or the virtual controller 500B are collectively referred to as a "controlling controller".

As illustrated in FIG. 20, the controlling controller first executes an operation S51. In the operation S51, it is checked whether the own controller controls the subordinate machine or the subordinate virtual machine. If it is determined in the operation S51 that the own controller controls the subordinate machine, the controlling controller executes an operation S52. If it is determined in the operation S51 that the own controller controls the subordinate virtual machine, the controlling controller executes an operation S53. In the operation S52, the processing unit generates processing to be executed which is equal to real processing. In the operation S53, the processing unit generates a process to be executed whose subordinate part is different from real processing.

After the operation S52 or the operation S53, the controlling controller executes an operation S61. In the operation S61, a determination unit receives information including control information from the other controller.

Next, the controlling controller executes an operation S62. In the operation S62, the determination unit checks whether the other controller controls the machine or the virtual machine based on information received from the other controller.

If it is determined in the operation S62 that the other controller controls the machine, the controlling controller executes an operation S63. If it is determined in the operation S62 that the other controller controls the virtual machine, the controlling controller executes an operation S64. In the operation S63, the processing unit matches an externally dependent part related to the operation of the machine among the processes to be executed with real processing. In the operation S64, the processing unit corrects the externally dependent part of the process to be executed with respect to the externally dependent part of the real processing based on the virtual modification program.

Next, the controlling controller executes an operation S65. In the operation S65, the processing unit executes the process to be executed. Next, the controlling controller executes an operation S66. In the operation S66, the processing unit confirms whether or not all predetermined processes are completed. If it is determined in the operation S66 that uncompleted processing remains, the controlling controller executes an operation S67. In the operation S67, the processing unit shifts the process to be executed to the next process. Thereafter, the controlling controller returns processing to the operation S61. Thereafter, until all the processes are completed, generation and execution of the process to be executed are repeated based on whether the other controller controls the machine or the virtual machine. If it is determined in the operation S66 that all processing is completed, the controlling controller completes the processing procedure.

As described above, the controllers 100, 200A, 200B, 500, 600A, 600B are communicable with another controllers 100, 200A, 200B, 500, 600A, 600B. The controllers 100, 200A, 200B, 500, 600A, 600B include: determination units 111, 211, 311, 511, 611 configured to determine whether the other controllers 100, 200A, 200B, 500, 600A, 600B controls the machines 2, 3A, 3B or controls the virtual machines V2, V3A, V3B corresponding to the machines 2, 3A, 3B; and a processing units 113, 213, 313, 513, 613 configured to execute predetermined real processing when the other controllers 100, 200A, 200B, 500, 600A, 600B controls the machines 2, 3A, 3B, and to execute virtual processing at least partially different from the real processing when the other controllers 100, 200A, 200B, 500, 600A, 600B controls the virtual machines V2, V3A, V3B.

In the other controllers 100, 200A, 200B, 500, 600A, and 600B, even if the operations of machines 2, 3A, and 3B can be simulated by the operations of virtual machines V2, V3A, and V3B, since the real space does not change with the operations of the virtual machines V2, V3A, and V3B, processes based on the state of the real space cannot be executed in the controllers 100, 200A, 200B, 500, 600A, and 600B, and the process of the entire system may not be simulated. On the other hand, in the controllers 100, 200A, 200B, 500, 600A, and 600B, it is determined whether the other controllers 100, 200A, 200B, 500, 600A, and 600B control the machines 2, 3A, and 3B or controls the virtual machines V2, V3A, and V3B, and virtual processing that is at least partially different from the real processing is executed when the other controllers 100, 200A, 200B, 500, 600A, and 600B controls the virtual machines V2, V3A, and V3B. As described above, according to the configuration in which the processing contents of the controllers 100, 200A, 200B, 500, 600A, and 600B are changed depending on whether the control targets of the other controllers 100, 200A, 200B, 500, 600A, and 600B are the machines 2, 3A, 3B or the virtual machines V2, V3A, and V3B, the processing of the entire system can be efficiently simulated.

The determination units 111, 211, 311, 511, and 611 may be configured to determine, based on communication condition for receiving information from the other controllers 100, 200A, 200B, 500, 600A, and 600B, whether the other controllers 100, 200A, 200B, 500, 600A, and 600B control the machines 2, 3A, and 3B or control the virtual machines V2, V3A, and V3B. Based on the information from the other controllers 100, 200A, 200B, 500, 600A, and 600B, whether the other controllers 100, 200A, 200B, 500, 600A, and 600B control the machines 2, 3A, and 3B or control the virtual machines V2, V3A, and V3B may be efficiently determined.

The information received from the other controllers 100, 200A, 200B, 500, 600A, and 600B may include control information in the other controllers 100, 200A, 200B, 500, 600A, and 600B and a flag indicating whether the other controllers 100, 200A, 200B, 500, 600A, and 600B control the machines 2, 3A, and 3B or control the virtual machines V2, V3A, and V3B. The determination units 111, 211, 311, 511, and 611 may be configured to determine whether the other controllers 100, 200A, 200B, 500, 600A, and 600B control the machines 2, 3A, and 3B or control the virtual machines V2, V3A, and V3B based on the flag. The processing unit 113, 213, 313, 513, and 613 may be configured to execute the real processing or the virtual processing based on the control information. It can be more efficiently determined whether the other controllers 100, 200A, 200B, 500, 600A, and 600B control the machines 2, 3A, and 3B or the virtual machines V2, V3A, and V3B.

The information received from the other controllers 100, 200A, 200B, 500, 600A, and 600B may include control information in the other controllers 100, 200A, 200B, 500, 600A, and 600B. The determination units 111, 211, 311, 511, and 611 may be configured to determine whether the other controllers 100, 200A, 200B, 500, 600A, and 600B controls the machines 2, 3A, and 3B or the virtual machines V2, V3A, and V3B based on the control information. The processing units 113, 213, 313, 513, and 613 may be configured to execute the real processing or the virtual processing based on the control information. Since the flag may not be added, the processing in the other controllers 100, 200A, 200B, 500, 600A, and 600B can be simplified.

The determination units 111, 211, 311, 511, and 611 may be configured to determine whether the other controllers 100, 200A, 200B, 500, 600A, and 600B control the machines 2, 3A, 3B or control the virtual machines V2, V3A, and V3B based on the communication condition for receiving information from the other controllers 100, 200A, 200B, 500, 600A, and 600B. Even when there is no difference in the control information, whether the other controllers 100, 200A, 200B, 500, 600A, and 600B control the machines 2, 3A, and 3B or the virtual machines V2, V3A, and V3B may be efficiently determined.

The processing units 113, 213, 313, 513, and 613 may be configured to execute virtual processing including supplementary processing for compensating for a difference between real information obtained based on the operations of the machines 2, 3A, and 3B and virtual information obtained based on the operations of the virtual machines V2, V3A, and V3B. The operation of the system can be more efficiently simulated.

The processing units 113, 213, 313, 513, and 613 may be configured to execute the supplementary processing including processing for supplementing predetermined data with respect to a difference between real information and virtual information. The operation of the system can be more efficiently simulated.

The processing units 113, 213, 313, 513, and 613 may be configured to execute the virtual processing including a skip processing instruction for skipping at least a part of the real processing. For example, the simulation can be efficiently executed by skipping the process of waiting for a change in real space that does not occur in the operations of the virtual machines V2, V3A, and V3B.

The controllers 100, 200A, 200B, 300, 500, 600A, and 600B may further include the processing generation units 123, 223, 322, 523, and 623 configured to generate supplementary processing based on a difference between real information and virtual information. The operation of the system can be more efficiently simulated.

The controllers 100, 200A, 200B, 300, 500, 600A, and 600B may include: the interface generation units 121, 221, 321, 521, and 621 configured to generate a user interface including a display part indicating one or more non-executable parts that cannot be executed when the other controllers 100, 200A, 200B, 500, 600A, and 600B control the virtual machines V2, V3A, and V3B among the real processing, and an input part for inputting alternative processing to each of the one or more non-executable parts; and the processing generation units 123, 223, 322, 523, and 623 configured to generate virtual processing based on an input to the input part. The provision of a user interface that supports the generation of virtual processing can improve usability of the controllers 100, 200A, 200B, 500, 600A, and 600B.

The controllers 100, 200A, 200B, 500, 600A, and 600B may further include the substitution target specifying units 122, 222, 522, and 622 configured to specify one or more non-executable parts based on a difference between real information obtained based on operations of the machines 2, 3A, and 3B and virtual information obtained based on operations of the virtual machines V2, V3A, and V3B. The interface generation units 121, 221, 321, 521, and 621 may be configured to display the one or more non-executable parts specified by the substitution target specifying units 122, 222, 522, and 622 on the display part. The usability of controllers 100, 200A, 200B, 500, 600A, and 600B can be further improved.

The controllers 100, 200A, 200B, 500, 600A, and 600B may be the other controllers 100, 200A, 200B, 500, 600A, and 600B, and may be able to communicate with first controllers 100, 200A, 200B, 500, 600A, and 600B that control first machines 2, 3A, and 3B as the machines 2, 3A, and 3B and second controllers 100, 200A, 200B, 500, 600A, and 600B that control second machines 2, 3A, and 3B. The determination units 111, 211, 311, 511, and 611 may be configured to determine whether the first controllers 100, 200A, 200B, 500, 600A, and 600B control the first machines 2, 3A, and 3B or control first virtual machines V2, V3A, and V3B which are the virtual machines V2, V3A, and V3B, and whether the second controllers 100, 200A, 200B, 500, 600A, and 600B control the second machines 2, 3A, and 3B or control second virtual machines V2, V3A, and V3B corresponding to the second machines 2, 3A, and 3B. The processing units 113, 213, 313, 513, and 613 may be configured to: execute the virtual processing in which a first part related to operations of the first machines 2, 3A, and 3B are different from the real processing when the first controllers 100, 200A, 200B, 500, 600A, and 600B control the first virtual machines V2, V3A, and V3B and the second controllers 100, 200A, 200B, 500, 600A, and 600B control the second machines 2, 3A, and 3B; and execute the virtual processing in which a second part related to operations of the second virtual machines V2, V3A, and V3B are different from the real processing when the first controllers 100, 200A, 200B, 500, 600A, and 600B control the first machines 2, 3A, and 3B and the second controllers 100, 200A, 200B, 500, 600A, and 600B control the second machines 2, 3A, and 3B. Since the processing units 113, 213, 313, 513, and 613 execute virtual processing efficiently adjusted according to which controllers 100, 200A, 200B, 500, 600A, and 600B are virtual, the operation of the system can be more efficiently simulated.

The controllers 100, 200A, 200B, 500, 600A, and 600B may be a host controller communicable with a plurality of local controllers 100, 200A, 200B, 500, 600A, and 600B including the other controllers 100, 200A, 200B, 500, 600A, and 600B and may be configured to control a plurality of local machines 2, 3A, and 3B including the machines 2, 3A, and 3B via each of the local controllers 100, 200A, 200B, 500, 600A, and 600B.

The controllers 100, 200A, 200B, 500, 600A, and 600B may be the controllers 100, 200A, 200B, 500, 600A, and 600B configured to control subordinate machines 2, 3A, and 3B or subordinate virtual machines V2, V3A, and V3B corresponding to the subordinate machines 2, 3A, and 3B. The controllers 100, 200A, 200B, 500, 600A, and 600B may further include control target determination units 131, 231, 531, and 631 configured to determine whether the control target is the subordinate machines 2, 3A, and 3B or the subordinate virtual machines V2, V3A, and V3B. The processing units 113, 213, 313, 513, and 613 may be further configured to: execute the virtual processing in which an externally dependent part related to an operation of the machines 2, 3A, and 3B is different from the real processing when the other controllers 100, 200A, 200B, 500, 600A, and 600B control the virtual machines V2, V3A, and V3B and the controllers 100, 200A, 200B, 500, 600A, and 600B control the subordinate machines 2, 3A, and 3B; and execute the virtual processing in which a subordinate part related to an operation of the subordinate machines 2, 3A, and 3B is different from the real processing when the other controllers 100, 200A, 200B, 500, 600A, and 600B control the machine and the controllers 100, 200A, 200B, 500, 600A, and 600B controls the subordinate virtual machines V2, V3A, and V3B. By a configuration in which the processing contents of the controllers 100, 200A, 200B, 500, 600A, and 600B are changed depending on whether the controllers 100, 200A, 200B, 500, 600A, and 600B themselves control the subordinate machines 2, 3A, and 3B or the subordinate virtual machines V2, V3A, and V3B, the processing of the entire system can be more efficiently simulated.

The controllers 100, 200A, 200B, 500, 600A, and 600B may further include transmission units 132, 232, 532, and 632 configured to transmit, to the other controllers 100, 200A, 200B, 500, 600A, and 600B, information to which a determination result by the control target determination units 131, 231, 531, and 631 is added. The processing contents in the other controllers 100, 200A, 200B, 500, 600A, and 600B may be efficiently changed depending on whether the control target is subordinate machines 2, 3A, and 3B or subordinate virtual machines V2, V3A, and V3B. Also, the processing of the entire system may be efficiently simulated.

The controllers 100, 200A, 200B, 500, 600A, and 600B according to another aspect of the present disclosure is the controllers 100, 200A, 200B, 500, 600A, and 600B communicable with other controllers 100, 200A, 200B, 500, 600A, and 600B and configured to control a control target. The controllers 100, 200A, 200B, 500, 600A, and 600B include: control target determination units 131, 231, 531, and 631 configured to determine whether the control target is machines 2, 3A, 3B or virtual machines V2, V3A, V3B; and transmission units 132, 232, 532, and 632 configured to transmit, to the other controllers 100, 200A, 200B, 500, 600A, and 600B, information to which a determination result by the control target determination units 131, 231, 531, and 631 is added.

According to the controllers 100, 200A, 200B, 500, 600A, and 600B, whether the controllers 100, 200A, 200B, 500, 600A, and 600B control the controlling machines 2, 3A, 3B or the controlling virtual machines V2, V3A, and V3B may be efficiently determined, in the other controllers 100, 200A, 200B, 500, 600A, and 600B. The processing contents in the other controllers 100, 200 A, 200B, 500, 600A, and 600B may be efficiently changed depending on whether the control target is the subordinate machines 2, 3A, and 3B or the subordinate virtual machines V2, V3A, and V3B. Also, the processing of the entire system involving subordinate machines 2, 3A, and 3B may be efficiently simulated.

The controllers 100, 200 A, 200B, 500, 600A, and 600B may further include the processing units 113, 213, 313, 513, and 613 that execute real control processing when the control target is the machines 2, 3A, and 3B, and execute virtual control processing that is at least partially different from the real control processing when the control target is the virtual machines V2, V3A, and V3B. Accordingly, the determination result indicating whether the control target is the subordinate machines 2, 3A, and 3B or the subordinate virtual machines V2, V3A, and V3B can be efficiently used for switching between the real control processing and the virtual control processing.

The controllers 100, 200 A, 200B, 500, 600A, and 600B may further include a power circuit configured to output driving power to the machines 2, 3A, and 3B. The processing units 113, 213, 313, 513, and 613 may execute real control processing including processing for causing the power circuit to output driving power when the control target is the machines 2, 3A, and 3B, and may execute virtual control processing not including processing for causing the power circuit to output driving power when the control target is the virtual machines V2, V3A, and V3B.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A controller configured to control a first machine as a controlled object in a real space, the controller comprising circuitry configured to:
    receive one or more communications, including operational information of a second controlled object that is controlled by a second controller;
    determine, in response to receiving at least one of the one or more communications, whether the second controlled object is a second machine that operates in the real space, or a virtual second machine that simulates operations of the second machine in a virtual space;
    control the first machine, in response to said determination that the second controlled object of the second controller is the second machine that operates in the real space, by executing a process to:
        obtain, from the real space, a set of real data including a status of a workpiece in the real space; and
        operate the first machine based on both the set of real data and the operational information of the second controlled object received from the second controller, so that both the first machine and the second machine operate on the workpiece in the real space; and
    control the first machine, in response to said determination that the second controlled object of the second controller is the virtual second machine that operates in the virtual space, by executing a modified process to:
        operate the first machine in the real space based, at least in part, on the operational information of the second controlled object received from the second controller, so that the first machine operates in the real space without the set of real data when the modified process is executed by the first controller.

2. The controller according to claim 1, wherein the circuitry is configured to determine whether the second controlled object is the second machine or the virtual second machine based on a notification in the one or more communications.

3. The controller according to claim 2, wherein the information received from the second controller includes operation information of the second machine or the virtual second machine, and a flag indicating whether the second controller controls the second machine or the virtual second machine, and
    wherein the circuitry is configured to:
        determine whether the second controller controls the second machine or the virtual second machine based on the flag; and
        execute the processing or the modified processing based on the operation information.

4. The controller according to claim 1, wherein the second controller is configured to:
    communicate with the controller in a first communication condition while controlling the second machine; and
    communicate with the controller in a second communication condition while controlling the virtual second machine, and
wherein the circuitry is configured to:
    determine the second controlled object is the second machine in response to determining that a condition of the at least one of the one or more communications is the first communication condition; and
    determine the second controlled object is the virtual second machine in response to determining that the condition of the at least one of the one or more communications is the second communication condition.

5. The controller according to claim 1, wherein the circuitry is configured to:
    supplement a set of virtual data instead of obtaining the set of real data; and
    execute the modified process to operate the first machine in the real space based on both the operation information of the second controlled object and the supplemented set of virtual data.

6. The controller according to claim 1, wherein the circuitry is configured to ignore the set of real data when executing the modified process.

7. The controller according to claim 1, wherein the circuitry is configured to:
    extract a part of the process executed based on the set of real data; and
    modify the extracted part of the process in response to determining that the second controlled object is the virtual second machine.

8. The controller according to claim 1, wherein the circuitry is configured to:
    extract a part of the process executed based on the set of real data;
    generate a user interface indicating the extracted part of the process; and
    modify the process based on a user input to modify the extracted part of the process.

9. The controller according to claim 1, wherein the controller is a host controller communicable with a plurality of local controllers including the second controller, and wherein the circuitry is configured to control the first machine and the second machine via the plurality of local controllers.

10. The controller according to claim 1, wherein the controller is further configured to
control, as the controlled object, a virtual first machine that simulates operations of the first machine in the virtual space.

11. The controller according to claim 10, wherein the circuitry is configured to:
modify a first part of the process in response to determining that the controlled object is the virtual first machine;
modify a second part of the process in response to determining that the second controlled object is the virtual second machine; and
control the virtual first machine by executing the modified process including the modified first part and the modified second part to operate the virtual first machine based on the operational information of the second controlled object.

12. The controller according to claim 10, wherein the circuitry is configured to transmit, to the second controller, notification information to notify the second controller whether the controlled object is the first machine or the virtual first machine.

13. The controller according to claim 1, wherein the circuitry is configured to execute the modified process to operate the first machine in the real space based, at least in part, on the operational information of the second controlled object received from the second controller, even when the workpiece is absent from the real space.

14. The controller according to claim 1, wherein the circuitry is configured to determine whether the second controlled object is the second machine or the virtual second machine, based on a flag included in the one or more communications.

15. The controller according to claim 1, wherein the circuitry is further configured to control the first machine by executing the modified process to:
supplement a set of virtual data without obtaining the set of real data; or
ignore the set of real data.

16. The controller according to claim 1, wherein the circuitry is further configured to:
receive one or more second communications, including operational information of a third controlled object that is controlled by a third controller;
determine, in response to receiving the one or more second communications, whether the third controlled object is a third machine that operates in the real space, or a virtual third machine that simulates operations of the third machine in the virtual space;
control the first machine, in response to said determination that the second controlled object is the virtual second machine that operates in the virtual space, by executing a modified first part of the process to operate the first machine in the real space based, at least in part, on the operational information of the second controlled object received from the second controller, so that the first machine operates in the real space without the set of real data when the modified first part is executed by the first controller; and
control the first machine, in response to said determination that the third controlled object is the virtual third machine that operates in the virtual space, by executing a modified second part of the process to operate the first machine in the real space based, at least in part, on the operational information of the third controlled object received from the third controller, so that the first machine operates in the real space without the set of real data when the modified second part is executed by the first controller.

17. A method for controlling a first machine as a controlled object in a real space, the method comprising:
receiving one or more communications, including operational information of a second controlled object that is controlled by a second controller;
determining, in response to receiving at least one of the one or more communications, whether a second controlled object is a second machine that operates in the real space or a virtual second machine that simulates operations of the second machine in a virtual space;
controlling the first machine, in response to said determination that the second controlled object of the second controller is the second machine that operates in the real space, by executing a process to:
obtain, from the real space, a set of real data including a status of a workpiece in the real space; and
operate the first machine based on both the set of real data and the operational information of the second controlled object received from the second controller, so that both the first machine and the second machine operate on the workpiece in the real space; and
controlling the first machine, in response to determining that the second controlled object of the second controller is the virtual second machine that operates in virtual space, by executing a modified process to:
operate the first machine in the real space based, at least in part, on the operational information of the second controlled object received from the second controller, so that the first machine operates in the real space without the set of real data when the modified process is executed by the first controller.

18. The method according to claim 17, wherein said determining whether the second controlled object is the second machine or the virtual second machine is based on a flag included in the one or more communications.

19. The method according to claim 17, wherein the modified process is executed to operate the first machine in the real space by:
supplementing a set of virtual data without obtaining the set of real data; or
ignoring the set of real data.

20. The method according to claim 17, wherein the modified process is executed to operate the first machine in the real space based, at least in part, on the operational information of the second controlled object received from the second controller, even when the workpiece is absent from the real space.

* * * * *